US006523782B2

United States Patent
Barutt

(10) Patent No.: US 6,523,782 B2
(45) Date of Patent: Feb. 25, 2003

(54) CENTRIFUGAL SLEEPING SECTION FOR A SPACE CRAFT

(76) Inventor: John Barutt, 5834 Ward Ave. NE, Bainbridge Island, WA (US) 98110

( * ) Notice: Subject to any disclaimer, the term of this patent is extended or adjusted under 35 U.S.C. 154(b) by 0 days.

(21) Appl. No.: 09/757,110

(22) Filed: Jan. 8, 2001

(65) Prior Publication Data

US 2002/0074457 A1 Jun. 20, 2002

Related U.S. Application Data

(60) Provisional application No. 60/175,114, filed on Jan. 6, 2000.

(51) Int. Cl.[7] ................................................ B64G 1/60
(52) U.S. Cl. ..................................................... 244/159
(58) Field of Search ................................ 244/159, 162, 244/163; 472/29, 31, 40

(56) References Cited

U.S. PATENT DOCUMENTS

| 625,074 | A |   | 5/1899 | Weber |         |
|---------|---|---|--------|-------|---------|
| 883,953 | A |   | 4/1908 | Hanlon |        |
| 953,119 | A |   | 3/1910 | Bramkamp |      |
| 3,144,219 | A | | 8/1964 | Schnitzer |     |
| 3,210,026 | A | * | 10/1965 | Frisch | 244/159 |
| 4,643,375 | A | * | 2/1987 | Allen | 244/162 |
| 5,558,581 | A | * | 9/1996 | Knijpstra | 472/31 |
| 6,216,984 | B1 | * | 4/2001 | Brinsmade | 244/159 |

* cited by examiner

Primary Examiner—Robert P. Swiatek
(74) Attorney, Agent, or Firm—Robert B. Hughes; Hughes Law Firm, PLLC

(57) ABSTRACT

A system for providing a simulated gravitational environment in a weightless or low gravity environment to enable a person to be in different physical positions, such as a rest/sleep position, a more upright position, a sitting position, and other positions. There is a support platform or platforms mounted to a support structure for rotation about a main axis of a base structure. The platform is movable about a transverse axis to various positions relative to the simulated gravitational force so that the person can transition from different positions either while sleeping or being awake.

28 Claims, 8 Drawing Sheets

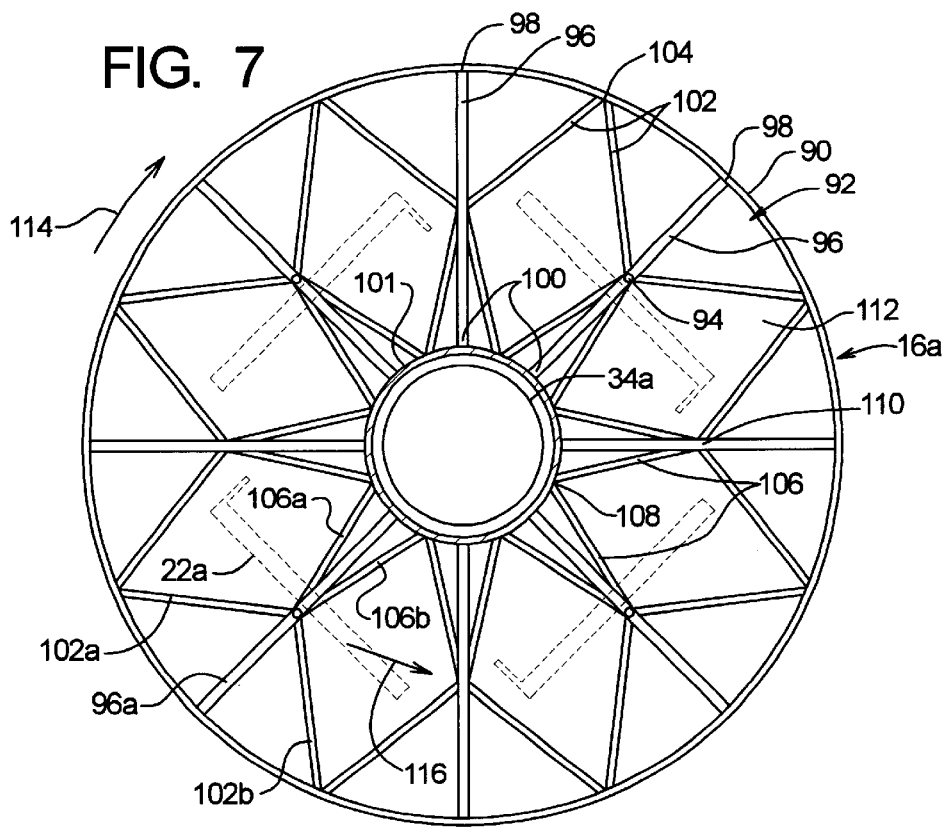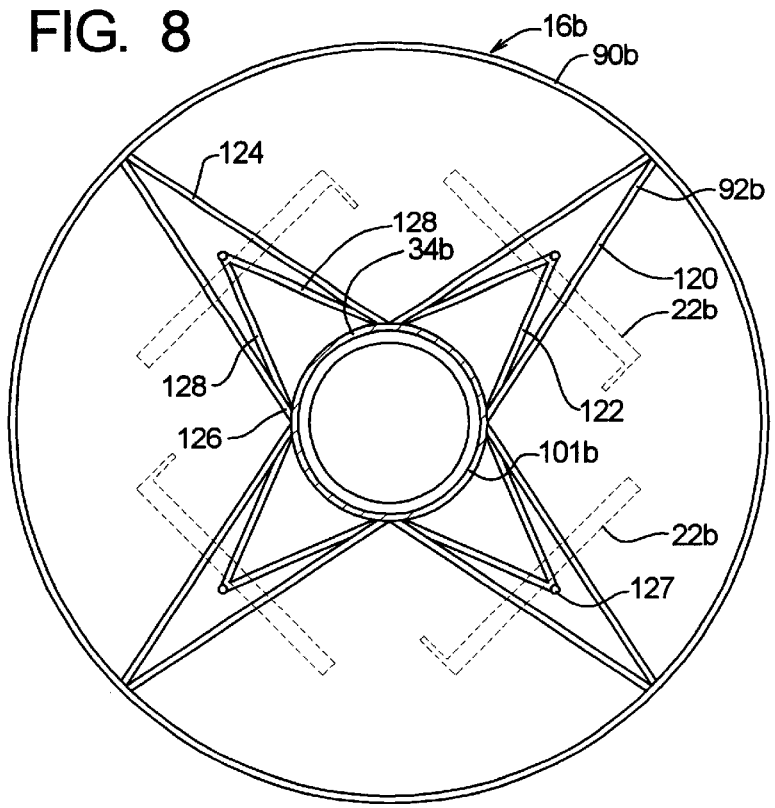

CENTRIFUGAL SLEEPING SECTION FOR A SPACE CRAFT

CROSS-REFERENCE TO RELATED APPLICATION

This application claims the benefit of the priority of U.S. provisional application No. 60/175,114, filed Jan. 6, 2000.

FIELD OF THE INVENTION

The present invention relates to a centrifugal sleeping system which is particularly adapted for use in a weightless environment, such as exists in outer space, or in an environment where there is less gravitational force than on earth. More particularly, this relates to an apparatus, system and method where centrifugal force is used to produce the effects of the force of gravity, and the person can be positioned and located so that the gravity simulated forces can be imposed on the person's body when the person is asleep. Further, the person can be positioned in a variety of ways so that the gravity simulated forces can be optimized to maximize the benefits of such "artificial gravity", with this also being able to be accomplished while the person is asleep.

BACKGROUND OF THE INVENTION

The physiological problems of the effect of a weightless environment on astronauts have long been recognized. This is discussed in the 1986 summer issue of the newsletter entitled "Lifelines", which is identified as the "Newsletter of life sciences at Ames research center". In this issue of the newsletter, there is discussed various exercise regimes which might be used in the weightless space environment.

In this same news article, there is also a discussion of the long-term health of astronauts in a weightless environment, and a need for the understanding of the role of gravity on the basic biological processes. At the bottom of the second column of page 8, there is a discussion of the uses of a space centrifuge. On page 9, column 1, (first full paragraph) we find the following language:

"The need for space centrifuges by scientists have been recognized for years. This need has been expressed by the Space Sciences Board of the National Research Council since 1971 and by the NASA Life Sciences Advisory Committee since 1978."

In that same article, it is pointed out that the Soviets have used centrifuges since the late 1970's to study rat and plant physiology on their Cosmos biosatellites and on their Salyut space station. It is also stated that in 1985 that the ESA flew their first small centrifuge on Space lab.

Also, in the second full paragraph of column 1 on page 9 of that article, we find the following:

"The development of effective counter measures to astronaut deconditioning requires experimentation at gravity levels from one g to near zero. Many threshold effects are expected to occur within this range, and precise gravity levels may be required to stabilize human metabolism, and to understand gravity's role in a whole variety of organisms. Variable gravity levels less than one can also open new vistas in materials, science experimentation, and later aid in batch processing materials in orbit."

"It is recommended that a 1.8 m.dia. centrifuge be incorporated at the initial Operating Capability of the Space Station, with a growth potential to 4 m.dia. Perhaps after initial gravitational research on the Space Station, tethered platforms can be studied to provide very large diameters."

"The centrifuge would use the latest advances in space technology. It would be magnetically suspended and balanced so as not to interfere with the microgravity experimental environment. Magnetic suspension and propulsion would be similar to that used in satellite control moment giros and would be within electromagnetic interference requirements established for Shuttle, a counter-rotating inertia wheel would absorb gyroscopic, staring and stopping torks. It would rotate slowly at about 22 rpm and would be enclosed with fail safe control devices."

Also, in *The Physiologist,* Volume 34, No. 1 Supplement, published in 1991, pages S224 to S225 there is an article entitled "Progress in the Development of an Artificial Gravity Stimulator (AGS)", authored by David Cardus, Westly G. McTaggard and Scott Campbell.

This AGS is described as comprising a turntable, a traction system, a platform, four beds and a daily communication system. This is mounted for rotation about a vertical axis and the beds are arranged so as to be radially aligned with the head portion near the center of rotation and the foot portion at the perimeter of the turn table. The resting surface of the bed is horizontally aligned, and the four beds are evenly spaced from one another at 90 degree angles. The beds are mounted on "Genoa Traveler Tract" that allows radial displacement of the beds and also the removal if necessary. Also, the foot rest is adjustable. Further, the beds can be tilted to 6 degrees for head down tilt experiments.

Also a search of the patent literature has disclosed two patents in which there are centrifuge systems for creating artificial gravity in space. These are the following:

U.S. Pat. No. 4,643,375 (Allen) shows a crew quarters for a space ship positioned in a drum shaped enclosure. The drum is entered from a side port at the center of rotation of the drum. Ladders are provided to reach the circumferential walls which support the sleeping mats 59. To support the drum, there are circumferential guide ways 28 around the outside wall of the drum, and these are engaged by circumferentially spaced guide rollers 30. In order to drive the cylindrical module 24 to rotation, a motor 32 is mounted outside of the cylindrical housing 17, this motor 32 driving a pair of drive rollers 34 which engage the outer cylindrical surface of the outer cylindrical wall 25. In FIG. 4 there are shown a plurality of sleeping bags or pallets 59 positioned against the interior surface of the cylindrical wall 25 and extending parallel to the axis of rotation. Storage cabinet 60 are also provided.

U.S. Pat. No. 3,144,219 (Schnitzer) shows a manned spaced station where there are inflatable members 17 which can be deployed in a circular fashion in the general configuration of a torus. There are flexible tubular passageway elements 16 extending radially from the center structure outwardly to the surrounding tubular crew quarters 17. Reactive thrusting generating means 20 such as small reaction motors are connected to the central space station 11, and these are positioned to create a thrust to cause the entire space station 11 to rotate around its center axis. Also, thrust generating devices 30 are mounted on the periphery of the crew quarters 17 to generate reactive thrust to stop rotation in the event that zero gravity conditions are desired. The rotation of the space station 11 establishes centrifugal forces which stimulate gravitational forces within the crew quarters. As indicated in column 5, beginning on line 56, the crew quarters 17 are provided with inflatable built-in furnishings such as couches 22 which are connected to the floor 21.

Three patents were developed in the patentability search which disclose various rotational devices which are designed to operate in the normal gravitational environment on the surface of the earth.

U.S. Pat. No. 625,074 (Weber) shows an apparatus in the nature of a merry-go-round. The passenger compartments are arranged to remain vertical and face in one direction so that the person gets an unobstructed view away from the merry-go-round device.

U.S. Pat. No. 883,953 (Hanlon) discloses a device "for producing a theatrical stage effect". There are a number of stationary elements mounted to a platform which is rapidly rotated. There are spherically curved rings and when these are rotated rapidly, it gives the appearance of a spherical formation having different colors to create a kaleidoscopic effect.

U.S. Pat. No. 953,119 (Bramkamp) shows what could be described as a tilted merry-go-round where there are provided some seats rigidly mounted to the rotating platform and some which are swinging seats.

SUMMARY OF THE INVENTION

The method and apparatus of the present invention is designed to use centrifugal motion to simulate the force of gravity in a weightless environment, such as in outer space, or an environment where the force of gravity is rather small (e.g. on the moon, a smaller planet or an asteroid). One of the significant features of the present invention is that it enables the simulated gravitational force to be applied through the person's body while taking advantage of the sleeping state of the person. Depending on the particular arrangement of the centrifuge apparatus the centrifugal motion may have a tendency to create motion sickness or some other discomfort. However, I have discovered over the years that when people are sleeping, they have substantially no problem with motion sickness, even if they would normally be quite sensitive to motion sickness. During the sleeping period, the person can be oriented so that the force of gravity is going through the body while there is, at least part of the time, a substantial force component along the length of the person's body.

One of the advantages of the present invention is that these benefits can be derived without the person taking any pharmaceutical products, and without the person having to do any specific exercises or take other steps to impose gravity simulated forces on the person's body at other times.

Further, the present invention is able to provide a wide variety of comfort positions and also various orientations relative to the simulated gravity field created by the centrifugal effect. Also, the present invention is sufficiently versatile so that it could place a person in a horizontal position (relative to the direction of the simulated gravitational force), or in a reclining position, in a seated reclining position, in a seated position where the person's torso is upright, or even in a position where there is a gravity simulated force component directed from the person's feet toward the person's head or other parts of the person's body. Also, the apparatus is arranged so that the position of the person could be modified while the person is sleeping.

The specific apparatus and method will be described in more detail in the following text.

In the system of the present invention, there is a base structure and at least one support structure to provide support for at least one person, and which is mounted for rotational movement relative to the base structure about a main axis of rotation.

There is at least one support platform having a support surface to support at least one person. The platform is mounted to the support structure at a platform location, and spaced from the main axis, so as to travel in a travel path around the main axis so that there is imposed on the person on the platform a centrifugal force component relative to the main axis of rotation. This centrifugal force component contributes at least in part to the simulated gravitation force or forces.

The support platform has a main support surface arranged to support the person. The platform is movable between a sleep/rest position where the support surface has an overall alignment orientation that is closer to perpendicular to the gravity simulated gravitational force, and a non-rest position where the support surface has an alignment orientation that is closer to being aligned to the gravity simulated force or forces.

Thus, a person can be located on the platform in the sleep/rest position and be in a resting and/or sleeping mode while experiencing a simulated gravity environment, and also be positioned in the non-rest/sleep position where the person can experience the simulated gravity environment while the person is more closely aligned to the gravity simulated force or forces.

The support platform has a foot end and a head end, a lengthwise axis extending from the foot end to the head, a transverse axis extending generally transversely to said lengthwise axis. The platform is arranged for rotational movement about a generally transverse axis parallel to the transverse axis to move between the sleep/rest position and the non-sleep/rest position.

In a preferred embodiment, the support platform is also arranged for angular movement along a secondary axis of rotation having a substantial alignment component parallel to the lengthwise axis. Thus, the platform can be moved to different angular positions laterally to compensate for acceleration and decelerating forces imposed on the platform on start-up and slow-down.

In a preferred form, the platform has a generally transverse axis of rotation which is between the foot end and the head end of the platform.

In one embodiment, the platform has at least one configuration where the support surface is generally planar so as to present a generally level support surface in the sleep/rest position, and in the non-sleep/rest position provides a support surface that simulates more closely a standing position or a slanted standing position.

Also, in another preferred configuration of the present invention, the support platform has at least two support sections which can be moved angularly with respect to one another so that one portion of a person's body can be supported by one platform section, and a second portion of a person's body can be supported on the other platform section so that the two body portions can be angled with one another in a position other than a straight line alignment.

Also, in this embodiment, there is an option of a third support section which can be moved angularly to at least one other of the support sections, whereby three different portions of the person's body can be supported at different angular positions. Thus, the person can be in a seated, or a slanted seated position at different angular locations.

The system can be operated in a substantial weightless environment, and the support platform is arranged relative to the main axis of rotation so that the sleep/rest position and the non-sleep/rest position are oriented relative to the centrifugal force component as substantially being the same as the simulated gravitational force.

Also, the system is designed for operation in a low-gravity environment, where the system is subjected to a force of gravity less than the force of gravity on earth. The platform is mounted to the support structure in a manner that with the support platform being moved around the main axis at a rotational speed to create a centrifugal force of a given value, the centrifugal force and the force of gravity provide a resultant force, and the platform is arranged so that in the sleep/rest position, overall alignment is closer to perpendicular to the resultant force, and in the non-sleep/rest position is more closely aligned to the resultant force.

Also, in a preferred configuration, there is at or proximate two said main axes of rotation and access structure having an access passageway through which a person can move, and at least one access opening providing an access to said support platform.

A preferred configuration of the support structure is that it comprises two axially spaced frame members on opposite sides of the support platform. The support platform is mounted to the frame members about an axis of rotation extending between the frame members. Thus, the support platform is able to be rotated to different angular orientations within the two frame members. Desirably, the two frame sections comprise a truss-like structure extending from a center mounting location toward a circumferential location.

In another configuration, the support structure has a central support portion and a radially outward support portion, and mounting locations for the platform are at an intermediate location. The support structure comprises tension members which extend from the central portion and also from the radially outward portion to the intermediate support location to provide support for the platform.

It is to be understood that a plurality of platforms could be mounted in the system, and that these could be mounted to a single support structure in the form of a module that has support structure extending around the main axis of rotation, and the spacing of the plurality of platforms can be such so as to balance these centrifugal forces during operation.

In the method of the present invention, the main components are provided, the person is positioned on the platform, and the platform is moved to different positions, as described above, to simulate the gravitational environment, both for the sleep/rest position, the non-sleep/rest position, and other positions. It is believed that other steps and features of the method of the present invention are evident from reviewing the prior description under summary of the invention, and also the following detailed description. Various modifications to be made to the present invention without departing from the basic teachings thereof.

BRIEF DESCRIPTION OF THE DRAWINGS

FIG. 7 is a view of a frame section of one of the modules, taken parallel to the longitudinal center axis;

FIG. 8 is a somewhat schematic view of a fourth embodiment where there is shown a modified construction of one of the frame sections of one of the modules;

DESCRIPTION OF THE PREFERRED EMBODIMENTS

It is believed that a clearer understanding of the present invention will be achieved by first describing generally the main components of the system of the present invention, followed by a presentation of their operation. Then this will be followed by a more detailed description of the system, along with possible modifications and alternative embodiments.

A. General Description of the Main Components

Figure 1:
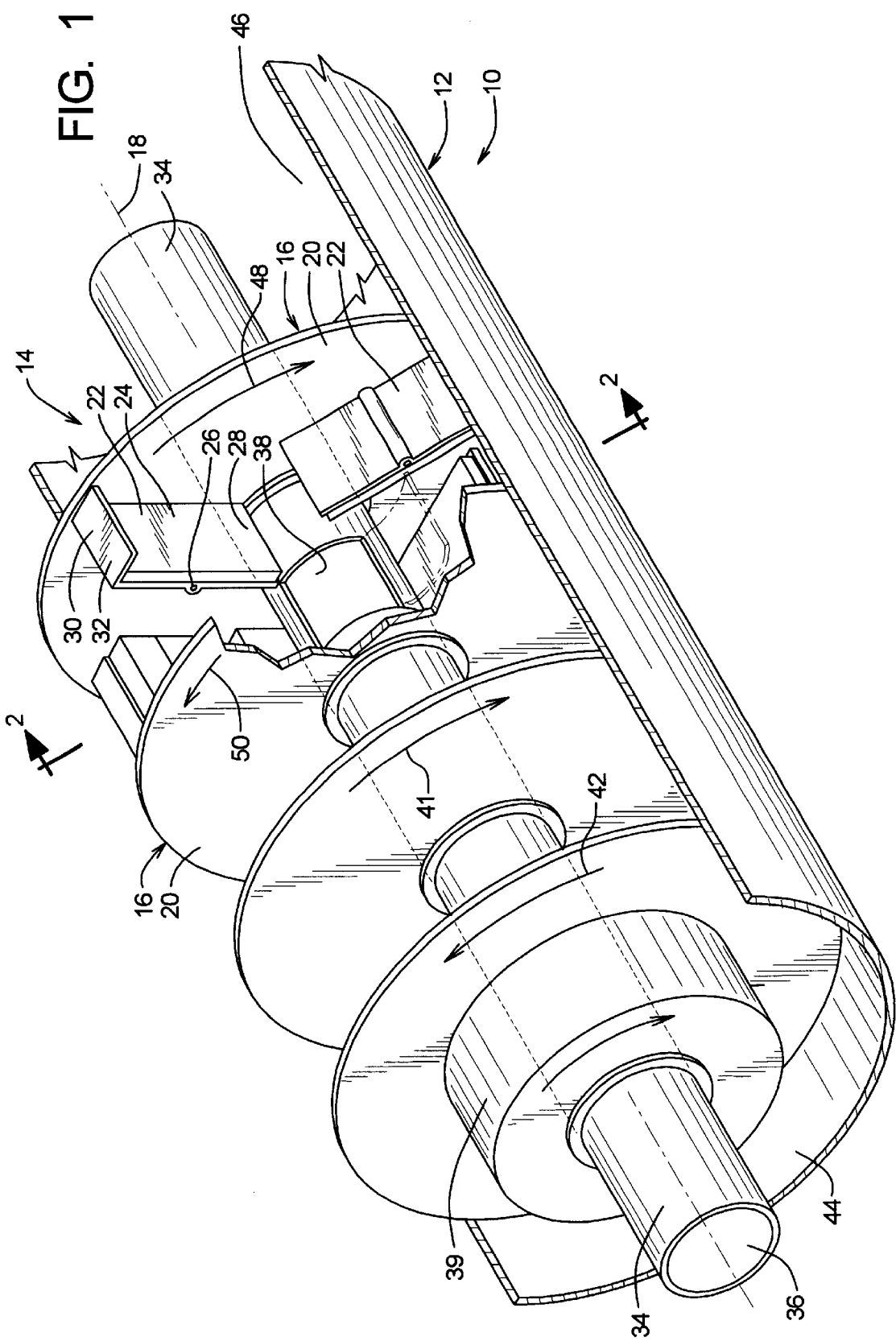
FIG. 1 is a somewhat schematic isometric view illustrating a first embodiment of the apparatus of the present invention, mounted in a space vehicle.
Figure 2:
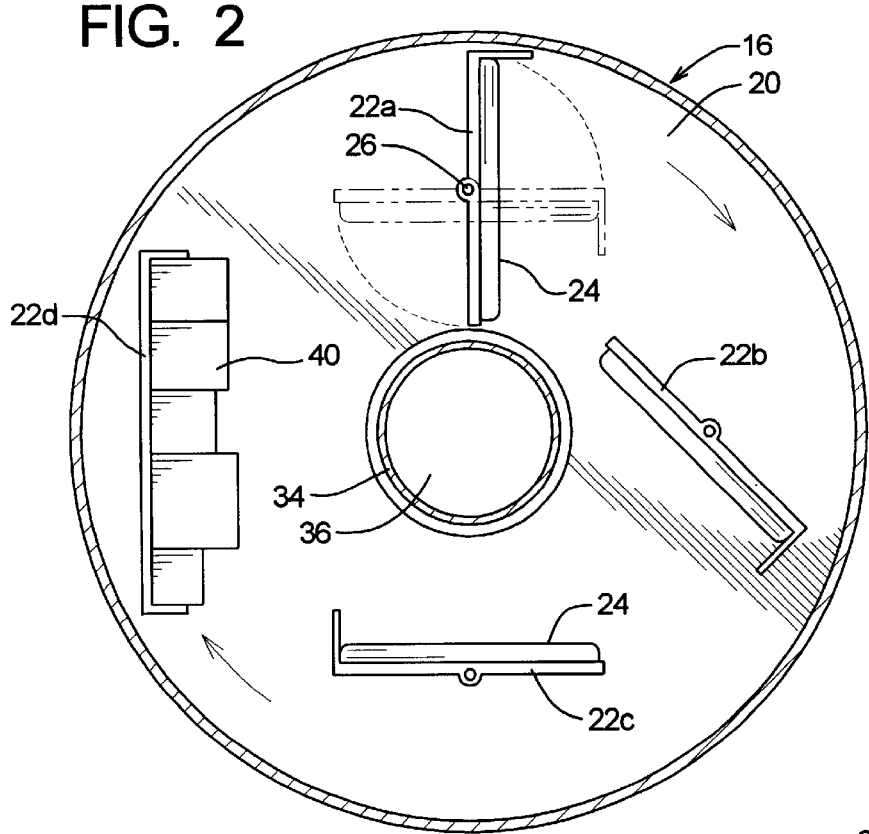
FIG. 2 is a sectional view taken along line 2—2 of FIG. 1.

Reference is first made to FIGS. 1 and 2, which show the main components of a first embodiment of the present invention somewhat schematically. The overall system 10 is adapted to be located as part of a spacecraft structure, with a portion of the spacecraft structure being shown somewhat schematically at 12. Located in the spacecraft structure is a gravity simulated sleeping section 14 which is in turn made up of a plurality of sleeping modules 16. The space craft structure can be considered as having a main longitudinal axis 18 about which sleeping section 14 is rotatably mounted.

Each sleeping module comprises a module support structure 20 which is simply shown schematically in FIG. 1 as a large rotatably mounted disc. Later in this text, there will be a further discussion of ways in which the support structure could be optimized to minimize weight, provide for convenient and effective operation, etc. Mounted to module support structure is a plurality of support platforms 22, each of which has a support surface 24 on which a person in the spacecraft can be supported.

Each support platform 22 is rotatably mounted to its related support structure 20 about its own transverse axis of rotation 26 which in this preferred embodiment is parallel to the main longitudinal axis 18, so that each platform 22 can be at various angular orientations. In the particular form shown in FIGS. 1 and 2, each platform 22 has a head end 28 where the person's head can be positioned, and a foot end 30 at which there is a foot support member 32, generally perpendicular to the support surface 24.

In this particular embodiment of the invention, the several sleeping modules 16 are mounted to a central support and access tube 34, the center axis of which is the same as the longitudinal center axis 18. This tube 34 provides a longitudinally aligned access passageway 36, with an access opening 38 for each module 16, by which a person can move into and out of the sleeping module 16.

Also shown schematically in FIG. 1 is an inertial mass 39 rotatably mounted to the center tube 24. The inertial mass 39 can be rotated in a direction and at a velocity to offset the inertial forces which would be generated by a person moving from a rest location in one of the modules 16 and with the module 16 being accelerated in a circular path to impart the desired centrifugal force to the person. Each of the modules 16 would be operatively connected to a power source so that it can be caused to accelerate from a stationary position to an operating velocity, and also be decelerated. Also, each of the platforms 22 have a positioning mechanism so that each platform 22 could be oriented at various locations relative to the center axis 18. A number of these positions are shown in FIG. 2.

B. Operation of the First Embodiment of the Present Invention

To explain the basic operation of the present invention, reference is now made to FIG. 2. Again, at the risk of being repetitious it is to be recognized that FIGS. 1 and 2 are somewhat schematic.

Let us assume that the space craft 12 with the sleeping section 14 has been accelerated into outer space and is not subject to any further acceleration at that time so that the people in the space craft 12 experience a weightless environment. It will be assumed that the spacecraft is sufficiently large so that there are a number of people in the spacecraft. It will also assumed that these people would be on some sort of a schedule to perform certain tasks in the spacecraft, and that the periods of work, rest and sleep for each of these people (hereinafter called "astronauts") will be done in cycles. Let us now assume that there are two people who are due for a period of sleep.

The two people will travel to one of the sleeping modules 16 by entering the access passageway 36 defined by the tube 34 and then exiting at the access opening 38 at that particular module 16. At this time none of the modules are rotating, and the astronauts are now in a weightless environment. There are four support platforms 22 in the particular module 16 shown in FIG. 2, and for convenience of description, these platforms will be designated 22a, 22b, 22c and 22d. It will be noted that the support platform 22d has a number of boxes 42 positioned on its support surface 24. One possible reason for this is so that these can serve as an inertial mass to balance out the centrifugal forces that are generated when the module 16 is rotated. Another possible reason is that these boxes could contain plants, or other objects which are to be subjected to a centrifugal force to simulate a gravitational force of varying strengths, or for producing timed cycles of applications of gravitational forces. In describing the two astronauts entering this module 16 to go through their sleeping cycle, we will at this time assume that these boxes 40 are not located in the module 16.

In the following description the term "inner" or "inward" will denote a location closer to, or in the direction toward, the longitudinal center axis 18, and the term "outward" or "outwardly" will denote the opposite location or direction. The terms "forward" and "rear" shall denote directions parallel to the longitudinal axis 18. In the drawing of FIG. 1, the left end, indicated at 44 shall be considered the forward location of the sleeping section 14, and the right hand location at 46 shall be considered the rear or rearward location.

To describe the rotational paths of travel of the module 16, the term "circumferentially forward" shall denote a direction in which the module 16 is rotating at any particular time, and the term "circumferentially rearward" will denote the opposite. Also, to describe the direction of rotation, the clockwise and counterclockwise directions of rotation will be referenced to a view where the person is looking rearwardly toward that particular module. Thus, the arrow indicated at 40 in FIG. 1 will be considered a clockwise direction, while the arrow indicated at 42 will be considered a counterclockwise direction.

To describe the operation of the present invention, let us assume that two astronauts have made their way down the passageway 36 and have arrived at the selected sleeping module 16. At this time, of course, they are in a weightless environment. With reference to FIG. 2 one of the astronauts would move to the platform 22a, and the other astronaut would move to the oppositely positioned platform 22c. The position of the platform 22 would be selected, and the platform 22 fixed in that location by suitable positioning device. Each astronaut would position himself (or herself) on the support surface 24 of the support platform 22 with the feet positioned against the foot support member 32.

As can be seen in FIG. 2, the platform 22c is positioned so that the plane of the support surface 24 is perpendicular to a radial line extending radially outwardly from the longitudinal center axis 18 to the plane of the platform 22c. This would place the person in (relative to the simulated gravity that the astronaut will experience when rotation of the module begins) in a horizontal sleeping position.

In FIG. 2, the platform 22a is shown with the support surface 24 radially aligned. Again, with the rotation of the module 16 causing the centrifugal force, this platform 22a would be sensed by the astronaut on that platform (relative to the simulated gravity that has developed as centrifugal force) to be in the vertical position. Thus, in effect, the astronaut would effectively (relative to the direction of the simulated gravity) be standing vertically. The platform 22a is also shown in broken lines in the horizontal position (i.e. where the plane of the support surface 24 is perpendicular to the radius, which would be, of course, the horizontal sleeping position), and during the course of one complete sleeping cycle, the platform 22 could be moved to intermediate positions or even beyond these ranges of position.

As will be described more completely later herein, each of the platforms would likely be provided with a body positioning and/or restraining device, possibly in the form of a sleeping bag with a certain amount of structural reinforcing and cushioning to maintain the person properly positioned on the platform 22. Thus, if the platform 22 is in the vertical position as shown at 22a in FIG. 2, the person's legs and body would be restrained in a manner so that the person could be totally at rest or even asleep, and still maintain the "vertical" position (i.e. this being a radially aligned position where the centrifugal force would be applied in a direction to give the person the feeling of being in a vertically aligned position in a normal gravity environment.

To return now to the sequence of the operation of the present invention, when the astronauts are positioned on their respective platforms 22a and 22c, the power drive for that particular module 16 is activated to cause the module 16 to begin to rotate. As the rotational velocity increases, the astronauts, (being positioned on the platforms 22a and 22c) will feel the centrifugal force imposed on them as a gravitational force. On the assumption that the mass of each of the astronauts resting on the platforms 22a and 22c is about equal, and assuming that the two platforms 22a and 22c are spaced at equal distances from the longitudinal center axis 18, the centrifugal force exerted by the mass of each astronaut and also of the platform and any other items that would be rotating with the module 18, would substantially cancel out, so that there would be substantially no net centrifugal force that would react into the tubular mounting structure 18.

At this point, it may be helpful to review some of the basic principals relating to the rotational movement, the centrifugal and acceleration forces, and also the inertial forces involved. We begin with Newton's law of motion, that for every action, there must be an equal and opposite reaction, and also that when a mass is stationary, the inertia of the mass (which we commonly equate to the weight of the mass on earth) would keep the mass stationary until an accelerating force is imparted on the mass to impart velocity to the mass. Once the mass in motion, then this same inertia will keep the mass moving in a given direction at a given velocity until some other force is imposed thereon to modify the same.

When we consider a body that has its center of mass spaced from an axis of rotation, and that mass then begins to move in a circular path around that axis of rotation, the following occurs. A centrifugal force is created which is equal to $\omega^2 r$, where $\omega$ is the angular velocity and "r" is the distance of the center of inertia of the mass from the center of rotation. Thus, the centrifugal force is directly proportional to its distance from the center of rotation, but is equal to the square of the rotational velocity (measured in terms of angular velocity).

Thus, with the astronaut being positioned in the horizontal position of FIG. 22c, since all portions of the astronaut's body are (as seen at 22 in FIG. 2) about equally distant from the center of rotation 15, the astronaut on the platform 22c will sense the centrifugal force exerted on the astronaut to be the same as (or at least nearly the same as) the gravitational force the astronaut would feel on earth (provided of course that the rotational velocity and radial distance creates a centrifugal force equal to the gravitational force).

Also, if the rotational velocity of the module 16 has been brought to a speed where the centrifugal force is about the same as earth's gravity, and the velocity remains constant, while the astronaut would in general feel the same forces as in the earth's gravity, this is not necessarily totally accurate. If the platform support surface 24 is in a single plane the center of the person's body is slightly closer to the center of rotation 18 than the head and feet of the person. Thus, the person's head and feet would each feel somewhat heavier, and the centrifugal force exerted at the person's head and feet would not only have the radially outwardly directed force component that would simulate actual gravity. Also, there would be a small horizontal force component that would tend to pull the head and the feet in a direction away from the person's body. However, if the support surface 24 platform 22 was generally aligned along a uniform curve about the longitudinal axis 18, the centrifugal force could almost exactly simulate actual gravity along the length of the person's body. The platform would not be uniformly curved but rather conform to the alignment of the body portions being supported.

Figure 6:
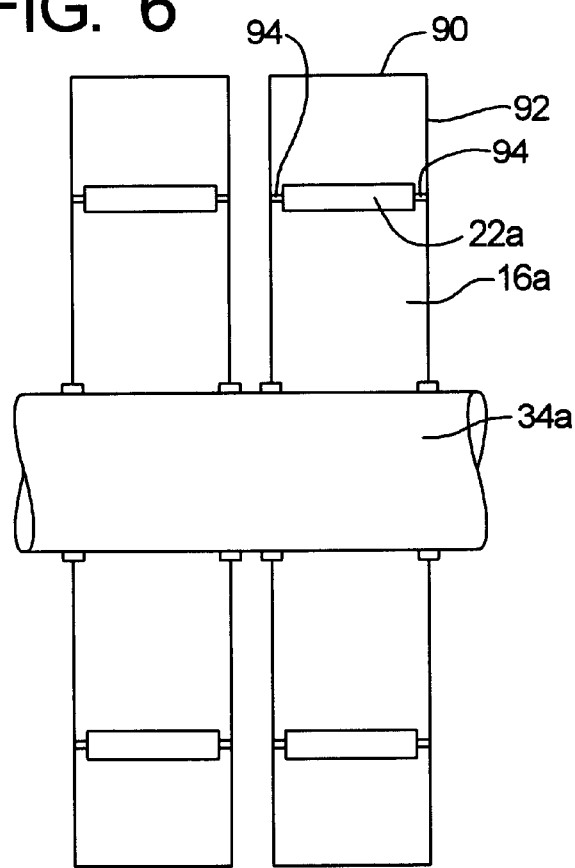
FIG. 6 is a view partly in section, taken along the longitudinal center axis of the access tube but showing a third embodiment of the present invention somewhat schematically.
Figure 6A:
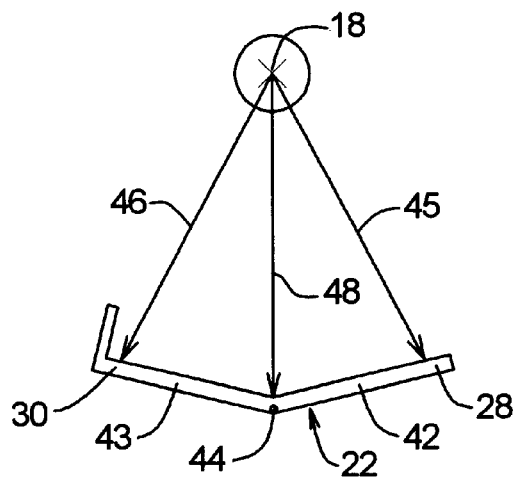
"FIG. 6a illustrates an arrangement of the platform in a modified configuration where the platform has a mid-pivot location, and with the platform being arranged to more nearly equalize the simulated gravitational force."

To explain this further, reference is now made to FIG. 6A, where there is shown a single platform 22 which is formed in two sections 42 and 43 which are joined along a transverse axis so that the two platform sections 42 and 43 can be rotated angularly with respect to one another for at least limited rotation. The platform section 42 is arranged to support the person's torso and head, and the platform section 43 supports the person's legs and feet. The location of the axis of rotation 44 would be approximately at the location below the lower end of the spine of the person a short distance at the location of where the person's legs can be moved angularly with respect to the person's torso.

Thus, when the person is sleeping in a horizontal position, the distance (indicated at 45) from the head end 28 of the platform 22 to the center axis of rotation 18 would be approximately the same as the distance (illustrated at 46) from the foot end 30 to the axis of rotation 44. Also, the pivot location 43 of the two platform sections 42 and 43 (illustrated at 48) would be approximately equal to the distances at 44 and 46.

Then when this platform 22 is moved to a more vertical location (i.e. or aligned with the center of rotation 44), the two platform sections 42 and 43 could be rotated through a short angular increment of travel with respect to one another so that the two platform sections 42 and 43 would be more aligned with one another.

Also, as indicated earlier, in addition to providing a power source to accelerate and decelerate the module 16, the power actuator could be provided to rotate any one of the platforms 22 about its own axis of rotation to position its platform to a desired angular orientation, and also to do this in a timed manner. For example, a person could begin the sleep period by resting horizontally in the position of the platform 22c of FIG. 2 and after a period of sleep could be moved to the position of the platform 22b which is at a 45 degree angle to the direction of the centrifugal force. As indicated previously, if the person is resting on the platform 22b when it is at the angled position shown in FIG. 2, there would be a restraining device to maintain the person's position against the support surface 24 of the platform 22b.

From the description which has been given thus far in the text, it is readily apparent that the method and apparatus of the present invention can be used not only to provide sleep for the person on a "horizontal" surface in a gravity simulated environment, but also to position the person during the sleep process so as to provide some of the benefits of the simulated gravity. It is well established that for various physiological reasons, a person's body should be subjected to the gravitational force (or simulated gravitational force) that would be directed in a direction from the head of the person toward the foot of the person while the person is vertically oriented relative to the gravitational force or simulated gravitational force. The benefits of this are well documented in the medical literature. Not only is this beneficial to the bone structure, but also to the circulatory systems of the body, the functioning of the person's lungs, etc. Also, it is known that when a person is sleeping, the person is less sensitive (or almost totally insensitive) to moderate motion or to position changes that are not made rapidly.

Also, with the apparatus of the present invention, it would be possible to perform experiments which may lead to an improved use of the sleep time by varying the position of the platform 22 and also varying the rotational velocity (and thus the centrifugal force) applied to the person. In addition to modifying the centrifugal force by changing the rotational velocity, the platform 22 could be positioned further away from (or closer to) the axis of rotation.

With the apparatus of the present invention being in a weightless environment, it would be possible, for example, to start out with the person sleeping horizontally with the rotational speed and distance from the rotational axis being such as to stimulate earth's normal gravity. Then the platform 22 could be rotated from the horizontal position of the platform at 22c to the slanted position of 22b. Also the rotational velocity could be changed to impart a stronger gravity stimulated force for one period of time and then a lesser force for another period of time, with a further possibility of these periods of greater or lesser gravitational force being accomplished in alternating cycles.

Figure 2A:
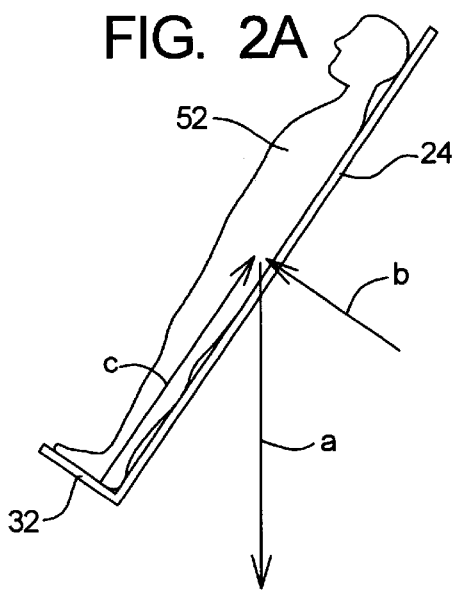
FIG. 2A is a somewhat schematic view illustrating a person resting on one of the support platforms and also disclosing the force components created by the centrifugal force of the rotating module.

Also, the platform 22 could be rotated to a somewhat "steep" angle where the plane of the surface 24 of the platform 22 is 30 degrees from the radial alignment (which is the simulated vertical direction). Let us examine the manner in which the force components may be imparted with this 30 degree "slant" from the vertical (see FIG. 2A). Let us assume that there is a 150-pound person indicated at 52, and that the simulated gravitational force is about equal to the force of gravity on earth. The centrifugal force (i.e. the simulated gravitational force) is indicated at "a" of FIG. 2A, and this would be resisted by two force components, namely a lesser force component "b" directed perpendicular to the support surface 24, and then also a force component "c" which is parallel to the support surface 24 and exerted by the foot platform 32.

Calculations of the force component "c" reveal that if the force at "a" is 150 pounds, the force at "c" would be approximately 123 pounds. Thus, there would be a rather substantial force component directed parallel to the length of a person's body from the person's foot to the head. Increasing the rotational velocity of the module 16 by a moderate amount (e.g. slightly less than about 15%), the force component "c" could be increased to a level equal to the total force of gravity that would be exerted on the person if the person were standing erect on the earth's surface. Yet the person would be resting on an incline where the person would still feel the back pressure (indicated by the force component "b" so that the person would be kept in a resting position). It is evident from the above discussion that controlled experiments could be conducted by use of this apparatus in a weightless environment which would not be possible on the earth's surface.

As another example, some people have found that there is some therapeutic value to have the person oriented on the earth's surface with the person's head lower than the feet for a period of time, or even be in a vertical position with the person's head at a lowermost position (this position being accomplished by what are called "gravity boots" which hold the feet at a higher elevation while the rest of the person's body hangs vertically downwardly from his or her boots). This could also be easily simulated with the apparatus of the present invention by inverting the platform at 22a in FIG. 2 180 degrees so that the foot support member 32 is closest to the axis of rotation 18.

Figure 3A:
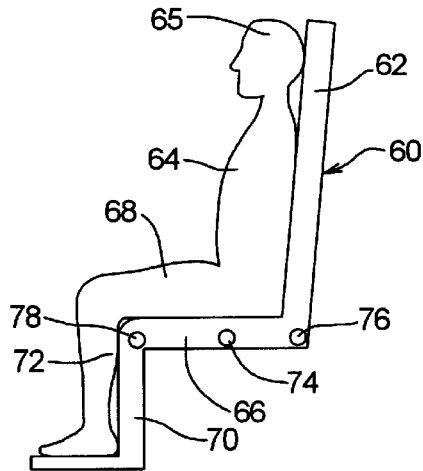
FIG. 3A is a somewhat schematic view illustrating a second embodiment where there is a modified form of the platform with the person positioned thereon in a seating position.
Figure 3B:
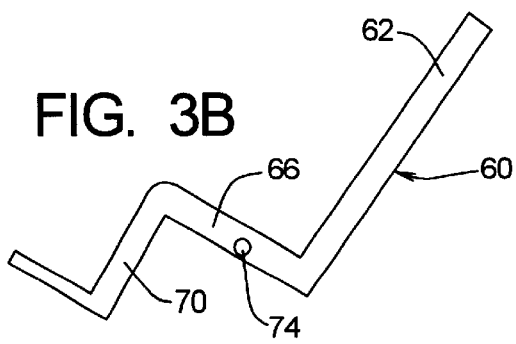
FIG. 3B is a view similar to 3a, but showing the platform configured as a seat in a more reclined position.

FIGS. 3A and 3B show a second embodiment of the platform 22, and this platform is designated as 60. The platform 60 can be made in three sections, namely a body section 62 to be positioned against the person's body 64 and head 65, an intermediate leg engaging section 66 to engage the person's thighs 68, and a third lower leg section 70 to engage the person's calves 72. The axis of rotation of the seat is shown at 74. As shown in FIG. 3B, this same arrangement as in FIG. 3a is shown except that the platform 60 has been rotated by 45 degrees to a more reclining position. Also, it would be possible for the person to use the platform as a chair support, with the module 16 being rotated to simulate gravity. The person could then be at a work location where he could perform certain tasks while having substantially the same gravitational environment as he would experience when seated on the earth's surface, with his body aligned with the direction of the gravitational force.

As a modification of this second embodiment in FIGS. 3A and 3B, the body support section 60 could be connected to the leg engaging section 66 about an axis of rotation 76. In like manner the leg engaging portion 66 could be connected to the lower leg section 70 at an axis of rotation 78. It can be seen that with this arrangement, the platform 60 could be positioned in the manner of the platform 22 shown in FIG. 6. Further, this platform 60 could also be moved into a planar configuration as shown at 22a, 22b and 22c of FIG. 2.

To discuss another aspect of the dynamics of the present invention, reference is made back to FIG. 1. There is shown the rearmost module 16 which is indicated as traveling in a clockwise direction as indicated by the arrow 41. The support member 20 for the next adjacent module 16 as shown by the arrow 40 is rotating in a counterclockwise direction. For convenience of illustration, the platforms 22 of this adjacent forward module 16 have not been shown. Desirably, when the two astronauts are positioned on opposite platforms 22 in the first module 16, and the first module 16 is accelerated to rotate to a velocity to simulate gravity for these two astronauts, the next forward module 16 would be rotated in the opposite direction. The second module would have an approximately equal effective inertial mass at the same radial distance so that the total rotating mass of the rearmost module 16 (at the same radial distance as the first inertial mass) would match that of the next forward module 16. The reason for this is that the momentum of the two inertial masses (i.e. the total momentum of the rear module 16 and the total momentum of the next forward module 16) would balance each other. The result is that the forces imparted to the support tube 34 would be rotationally opposite to one another and nearly equal.

If it were not possible to substantially cancel out these rotational inertial forces, then these forces would somehow have to be reacted into the space ship structure 12, which would cause a rotation of the space ship. This could be counteracted by operating positioning rockets to create adequate opposite thrust until the velocity of the modular module 16 remain constant and thus had no accelerating force to cause a rotational force moment. However, at such time as the module 16 were being decelerated, then there would be another rotational force reacted into the space ship 12 (assuming the inertial rotational forces do not cancel each other out), and this would have to be reacted in some manner by the space ship.

Let us now assume we have the situation where there are only two astronauts who are going to go through their sleeping cycle, and both of these are positioned on the same module 16 opposite to one another. Assuming that the mass of the two astronauts is about the same, then the centrifugal forces that are reacted into the tube structure 18 would be equal and opposite. However, there are the rotational inertial forces which would be reacted into the space ship structure 12. To counterbalance this, the counterweight 40 could be rotated in a direction opposite to that of the rotating module 16.

Figure 4:
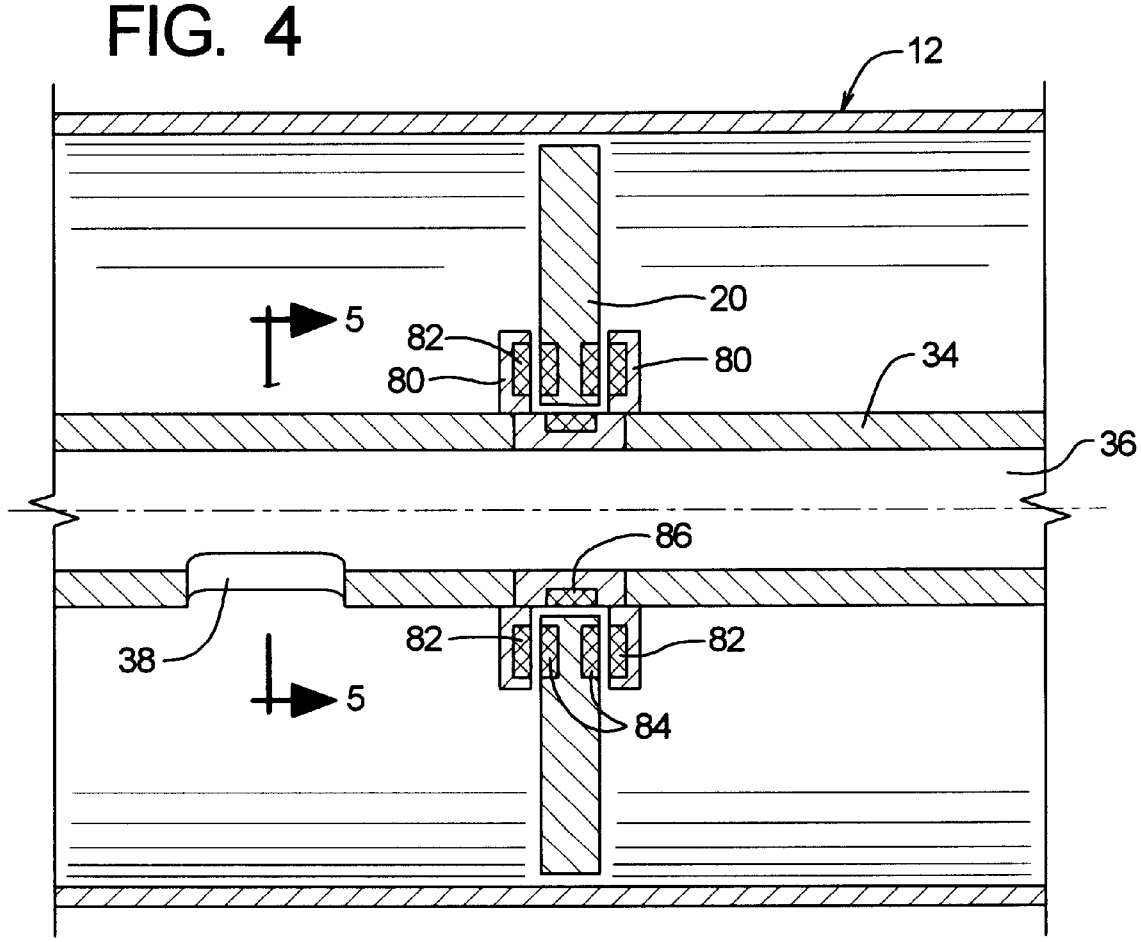
FIG. 4 is a schematic view of one section of the module of the present invention, and illustrating schematically the magnetic suspension and power system.
Figure 5:
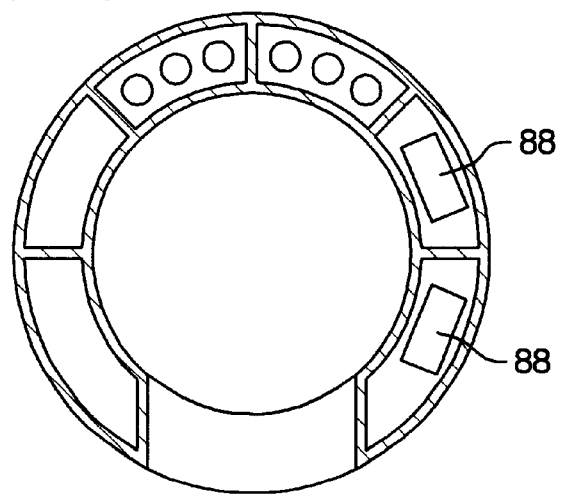
FIG. 5 is a sectional view taken along line 5—5 of FIG. 4.

Reference is made to FIGS. 4 and 5, which illustrate schematically the magnetic positioning and drive section of the present invention. Again, the space craft structure 12 is shown somewhat schematically, and also there is shown schematically the module support structure 20 which is shown as a large disc rotatably mounted within the space craft 12. There is the access tube 34 and one of the tube access openings is shown at 38.

There are two annular flanges 80 which extend around the tubular member 34 and extend radially outwardly a short distance. Positioned within these flange members 80 is a plurality of magnets 82, and there is positioned in the radially inward portion of the support structure 20 another set of magnets 84. The poles of the magnets 82 and 84 are arranged so that the sets of magnets 82 and 84 repel one another, thus causing the support structure 20 to remain centered within the two flange members 80. There is also located within the tube member 34 sets of magnets 86 which are located radially inwardly of the magnets 84. The poles of these magnets 86 are located so that the magnets 86 are repelled from the magnets 84. This repelling force thus positions the structure 20 so that it remains centered on the longitudinal center axis of rotation 26.

The support structure 20 is caused to rotate by an electromagnetic power source which can be supplied with alternating current in the proper timed relationship so that the electromotive power reacts with the magnets 84 within the support structure 20 to cause rotation of the support structure 20. Also, the electromotive drive members can be operated in a manner that the rotation of the support structure 20 can be decelerated. Two of the electromagnetic drive members are shown schematically at 88. Since it is well within the skill of the art to provide such a magnetic suspension and also the electromotive drive members, these will not be described in detail herein.

Also, it should be noted that when one of the modules 16 is being decelerated, the polarity of the electromagnetic drive members can be modified in such a way that instead of acting like a motor to cause the rotation of the module 16, it can act as a generator taking energy from the rotating module as it is being decelerated and transform this into electrical energy to be stored in a storage battery, this electrical energy could be used at a later time either to accelerate one of the modules for a subsequent cycle where the person may sleep and/or have other activities in a gravity environment. If two modules are caused to rotate in opposite directions so as to cancel out the effect of the momentum of the two modules, at such time as the two modules are decelerated, the same thing could be done (using the electromagnetic drive members to function as an electromagnetic generator) to generate the electricity which is then stored.

It was indicated earlier in this text that the support structure 20 for each of the modules of the present invention is shown somewhat schematically in FIGS. 1 and 2, simply to disclose the basic principals of operation. A more realistic modular structure will now be described with reference initially to FIGS. 6 and 7, showing a third embodiment of the present invention. In FIG. 6, there are shown two sleeping modules 16a mounted to the tubular support member 34a. Each module 16a comprises a cylindrical outer wall 90 and two frame members 92, each of which has a generally circular disc-like configuration, and these are spaced longitudinally from one another. Each pair of frame members 92 support the platforms 22a mounted at two side pivot locations 94, one in each of the frame members 92.

With reference to FIG. 7, which shows one of the support frames 92, it can be seen that the each support frame 92 comprises a plurality of radially extending struts 96 having an outer end 98 attached to the outer cylindrical wall 90, and an inner end 100 mounted to a sleeve or collar 101 that rotates around the tube 34a. Between each adjacent pair of struts 96 there are two radially outward bracing members 102 which connect to the outer wall 90 at a location 104 which is midway between the juncture points 98 of its adjacent struts 98. There is also for each pair of radially extending struts 96 a pair of inwardly positioned bracing members 106 which join at a juncture location 108 to the aforementioned mounting sleeve 102. Each of the two outer bracing members 102 and the inner bracing members 106 meet one another at an intermediate location 110 of the related strut 96. Thus, it can be seen that each pair of struts 102 and 106 form a diamond shaped reinforcing structure.

To describe the operation of the arrangements of FIGS. 6 and 7, it should first be noted that each of the platforms 22a is mounted by pivot locations 94 to the two lengthwise radially extending struts 96 of that module 16. In the weightless environment, and with no accelerating forces or other forces being imposed on the platforms 22 or on any other part of the module 16a, there will be no forces exerted on the support struts 96. Even if one of the astronauts moves into the chamber 112 defined by the two frames 92 and the outer cylindrical wall 90, and even if this astronaut does position his body adjacent to the platform 22a, there is still no force exerted on the platforms 22a except for possibly the very small inertial forces as the astronaut positions himself.

Let us assume that two astronauts are positioned oppositely on two of the platforms 22a of one module 16a, and two more astronauts are positioned oppositely to one another on the other module 16a. Let us assume that the total mass of the astronauts along with whatever other equipment or objects they might have with them are about equal so that the inertial forces created by the two modules rotating in opposite directions from one another and at the same rate of acceleration, would cancel each other out.

With reference to FIG. 7, it can be seen that as the module 16a begins to rotate, for example, in a clockwise direction, there will be an inertial force exerted by each of the platforms 22a and the astronaut located thereon, and also by the structure of the module 16a. To illustrate the manner in which these forces are exerted, reference will be made to the lower left hand part of FIG. 7, and the components will be given a suffix designations of "a" and "b" to illustrate the manner in which these forces are exerted. We will look now at the lower left hand part of FIG. 7, and it can be seen that there is the radially extending strut 96a, two outer bracing members 102a and 102b and two inner bracing members 106a and 106b.

On the assumption that the module 16a of FIG. 7 is starting to accelerate from a stationary position clockwise in the direction indicated by the arrow 114, the mass of the astronaut and of the platform 22a will create an inertial force, indicated at 116 opposite to the clockwise direction 114. The force will be transmitted by the platform 22a into its related strut 96a, and the two struts 102a and 106a will resist any displacement of the platform 22a in the direction of the inertial force 116 by exerting a tension force along each of the bracing struts 102a and 106a. The bracing struts 102*b* and 106*b* will be resisting the displacement of the strut 96*a* by reacting in compression.

At this time, when the module 16*a* is just starting to accelerate, any force exerted on the radially aligned strut 96*a* will be insignificant. It is contemplated that the acceleration of the module 16*a* would occur rather slowly, so that the inertial forces created by this slow acceleration of the astronaut, the platform 22*a*, and the rest of the structure would be very small. However, as the velocity of the module 16*a* slowly increases, the centrifugal force will increase proportionately. Assuming that the rate of acceleration remains the same, the inertial forces exerted by the astronauts, the platforms 22*a* and the other structure will not experience any increase. At such time as the modules 16*a* reach a rotational velocity so that the centrifugal force felt by the astronauts match the force of gravity, the centrifugal force of the astronauts that is reacted into the radially inward part of the related strut 96 would be a tension force equal to the mass of the astronauts plus any other structure that is restrained from outward movement by the struts 96.

From the above brief description it is already apparent that provided the rate of acceleration is rather low, the force that is imposed on the frame members 96, 102 and 106 remains quite small.

When each of the modules 16*a* is decelerating then similar forces are imposed except that these are reversed. Thus, assuming that the module 16*a* in FIG. 7 is starting to decelerate, then the inertial force 116 of the astronaut, the platform and other structure will be in the opposite direction. In this instance, the two struts 102*a* and 106*a* will be placed in compression, while the struts 102*b* and 106*b* will be placed in tension.

FIG. 8 shows a fourth embodiment similar to FIG. 7, but having a different frame structure. As in FIG. 8 there is a surrounding cylindrical wall 90*b* and two longitudinally spaced frames 92*b* with the platforms 22*b* and the center support tube 34*b*. The arrangement of this module shown at 16*b* is similar to that as shown in FIG. 6.

For purposes of clarity, the components of the frame 92*b* are shown somewhat schematically, without showing various braces which may be added as needed, for example, as shown in FIG. 7. There are four radially outward frame sections 120 extending from the collars 101*b* to the outer cylindrical wall 90*b*, and four frame sections 122, each of which supports a related platform 22*b*.

Each outer frame section 120 comprises a pair of struts 124 which have their inner ends 126 connected to the collars 101*b* at angularly spaced locations of a little bit less than 90 degrees. These two struts 124 converge toward one another in a radially outward direction to connect to the outer cylindrical wall 90*b* at a single location 127.

The function of the four frame components 120 each (comprising its two struts 124) is to cause the outer cylindrical wall 90*b* to rotate with the platforms 22*b*. Thus, when the module 16*b* is accelerating, one set of the components 124 will be in compression and the other in tension. When the module 16*b* is decelerating, the stresses will be imposed in a reverse fashion.

With regard to the four inner frame components 122, the function of each of these is to support the platforms 22*b*, and two frame components 128 of each frame section 122 served two functions. First, during acceleration and deceleration of the module 16*b*, one of these frame components 128 shall be in tension and the other in compression, and on deceleration, their roles will be reversed. Then when the module is rotating at a constant speed so that there is no acceleration or deceleration, these frame components 128 will be essentially in tension to properly position the platforms 22.

Figure 9:
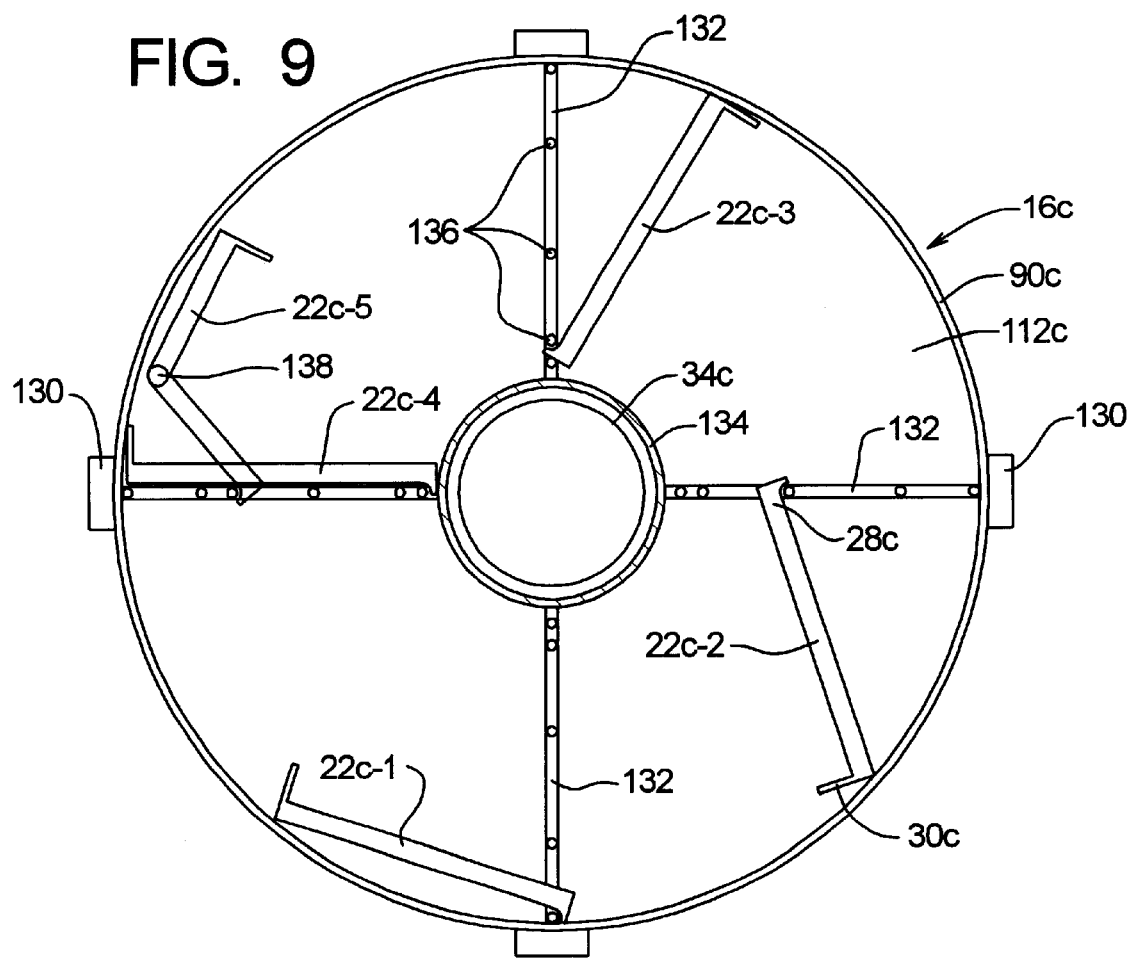
FIG. 9 is a view similar to FIGS. 7 and 8, showing schematically a fifth embodiment where there is yet another frame arrangement for mounting the platforms.

FIG. 9 shows a fifth embodiment where the module 16*c* comprises the outer cylindrical wall 90*c*, a plurality of platforms 22*c* and an access tube 34*c*. In this instance, the module 16*c* is powered from a power source at the perimeter wall 90*c*, and four actuators are shown somewhat schematically at 130. These could be electromagnetically driven power sources, mechanical power sources or some other power source.

There are four radially extending struts 132 extending radially from a center collar 134 that rotates around the center tube 34. Each of the collars 34 can be spaced from the center tube 34*c* by magnets which repel one another (as described previously herein) or low friction material between the collar 134 and the tube 34*c* could be used (or both could be used). There are shown four platforms 22*c* to illustrate different positions for the same. (It will be noted that in the left part of FIG. 9, two such platforms 22*c* are shown at the same angular location, simply to show two variations, it being understood that only one of these would be used at any one time).

In each instance, the platform 22 has its end foot portion 30*c* engaging the outer cylindrical wall 90. The head end 28*c* is connected to its related strut 132. In this instance, the strut 132 will (in supporting its related platform 22*c*) be substantially in tension. There are various connecting locations 136 on each strut, and the head end 28*c* can be selectively connected at any of the locations 136. Alternatively, there could be a slide mounted connection on the strut 132 (or other variable location connection) so that the head end 128*c* could be connected at any desired location. Further, for modifying the angular position of the platform 22*c*, the strut 132 could be provided with an actuator that would move head end 28*c* of the platform 22*c* along the length of the strut 132.

Let us take a situation, where the astronaut enters into the module chamber 112*c* and the selected platform 22*c* is positioned "horizontally" (with respect to the simulated gravity). This is shown at 22*c*-1. Let us assume that the module 16*c* is slowly accelerated, and as this is being accomplished, the astronaut begins to sleep. At a later time, it may be desirable to move the platform 22*c* to a moderate slant, as shown at 22*c*-2. This could be done by a controlled power element in the strut 132, by a cord attached to the head end of the platform 22*c*, or it could even be done manually by some third person who is not sleeping. Then if a steeper slope is desired, as shown at 22*c*-3, the head end 28*c* could be moved to a yet steeper location. Finally, as illustrated at 22*c*-4 the astronaut would be positioned in a "vertical" position (i.e. vertical with respect to the simulated gravity force).

As a possible alternative, there is shown a platform 22*c*-5 which has a middle pivot connection at 138. This could be provided so that the person's torso could be subjected to the vertical simulated gravity force component, while the legs would be "horizontal".

It is also to be understood, of course, that additional struts could be provided to connect to the foot end of the platform 22 or also intermediate locations. Also, it is to be recognized that the arrangement in FIG. 9 is shown somewhat schematically in that there would likely be additional bracing members in the side frames, such as illustrated in FIG. 7.

Figure 10:
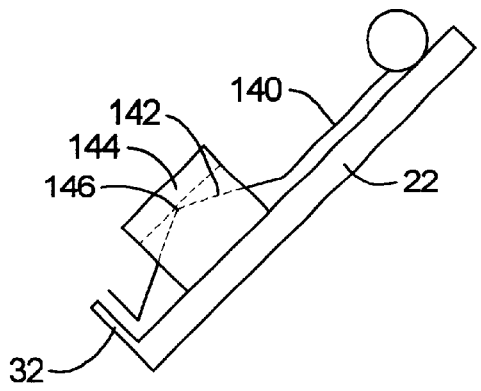
FIG. 10 is a side elevational view showing a first retaining device for positioning the astronaut on the support platform.
Figure 11:
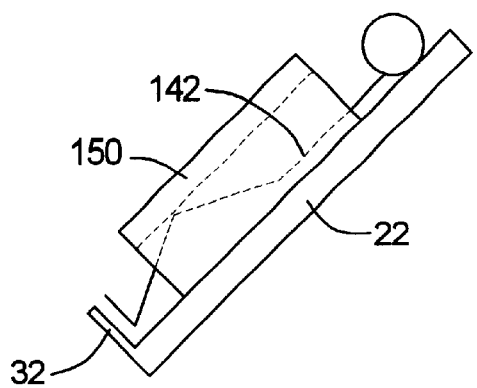
FIG. 11 is a view similar to FIG. 10, showing yet another retaining device.

To explain another aspect of the present invention, reference is now made to FIGS. 10 and 11. When the astronaut, (illustrated at 140) is resting on the platform 22 which is at an angle, the legs 142 of the astronaut would likely tend to bend at the knees when the astronaut is sleeping, as shown in FIG. 10, due to the "weight" of the astronaut being directed at a downward slant along the surface of the platform 22. To prevent this, there can be provided a restraining member 144 which could be cushioned for the comfort of the astronaut. As shown herein, this restraining member 144 is spaced from the astronauts knees 146 to provide a certain amount of movement. Alternatively, the restraining member could be made adjustable so as to be moved in more closely to astronaut.

In FIG. 11, there is shown substantially the same arrangement as FIG. 10, except that the restraining device 150 is shown extending upwardly over the body 142 of the astronaut. The upper portion of the restraining member 150 would provide safety in case the astronaut shifts laterally during sleep. Other safeguards could, of course, be used, such as side rails, etc. Since various positioning and/or restraining devices, such as inflatable or cushioned devices, rigid, semi-rigid, etc. are known in the prior art, these will not be described in detail herein.

Figure 12:
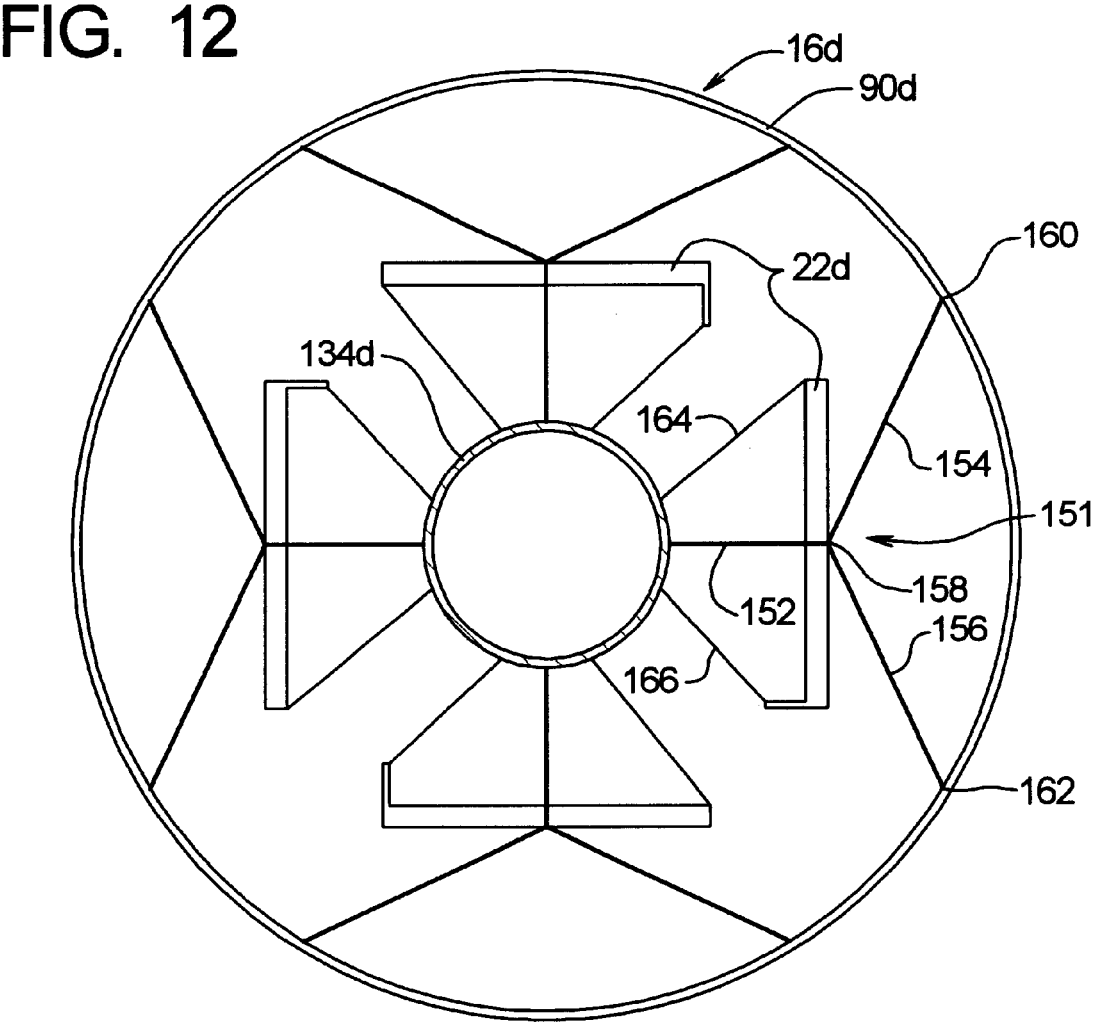
FIG. 12 is a view of a sixth embodiment of a frame section of the present invention, this view being similar to FIGS. 7, 8 and 9, showing the frame section being formed substantially entirely of tension members.

To describe now a sixth embodiment, which is another possible arrangement of the present invention, reference is now made to FIG. 12, which shows a module 16d having an outer cylindrical wall 90d, platforms 22d, and two central collars 134d. In this instance, there are four frame sections 151, all of which are made of tension members. Each frame section 151 comprises a single radially extending cord 152 which attaches at its inner end to its collar 134d and at its outer end to two other cords 154 and 156 at a juncture location 158. The two cords 154 and 156 in turn extend in a generally radially outward direction while diverging radially outwardly from one another to connect to the cylindrical wall 90d at circumferentially spaced connecting locations 160 and 162, respectively. The platform members 22d connect to the tension frame component sections 151 at the intersecting location 158. Also, the orientation of each of the platforms 22d can be controlled by a pair of tension members 164 and 166 at opposite ends of the platform.

It is to be understood that this sixth embodiment could also comprise additional bracing members to maintain the platforms at 22d in their proper position. For example, in addition to having the diagonally aligned cords 154 and 156 lying in a plane transverse to the longitudinal axis 18, there could be three or more of such cords 154 and 156 which not only slant in a radial direction, but have slant components in an axial direction, so that if there are four such cords, two cords 154 and one cord 156, all extending away from each other so that these would be positioned as would be the four downwardly and outwardly slanting connection lines of a four-sided pyramid, these four cords 154 and 156 would be positioning the center axis of location of the platforms 22 not only in a radial direction, but also in an axial direction. Or two cords could be attached one to each side of the juncture location 158, with the two cords crossing in and 'X' configuration to provide additional stability.

This also applies to the prior embodiments where various truss-like structures and bracing members are shown. Thus, for example, in the arrangements of both FIGS. 7 and 8, the members which are placed alternatively in compression and tension, depending on whether the modules are accelerating or decelerating, there could be some further basing members which slant in an axial direction to provide stability relative to movement having alignment components parallel to the longitudinal axis 118. Since it is well within the skill of the art for people of engineering skill in structure to make such arrangements, these will not be described in detail herein.

Figure 13:
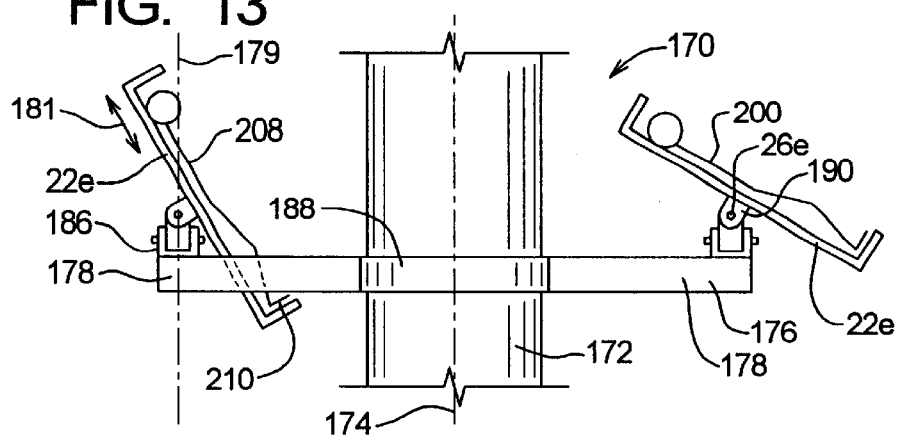
FIG. 13 is a side elevational view showing a seventh embodiment of the present invention used in an environment where there is a gravitational force somewhat lighter than the earth, with this particular embodiment being arranged to simulate the force of gravity on the earth's surface, or possibly a gravitational force somewhat greater than the gravity on the earth's surface.
Figure 14:
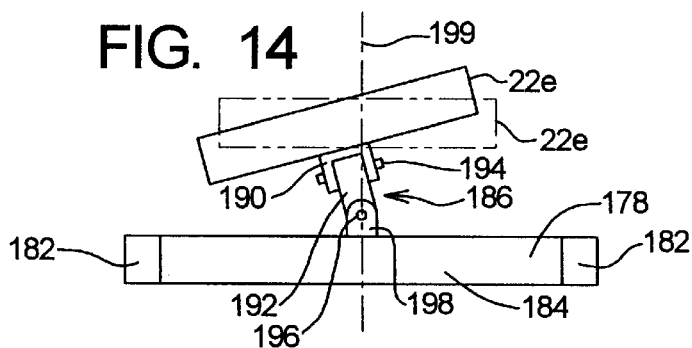
FIG. 14 is an end view, drawn to an enlarged scale, showing the frame, platform and support mechanism for the platform of FIG. 13.
Figure 15:
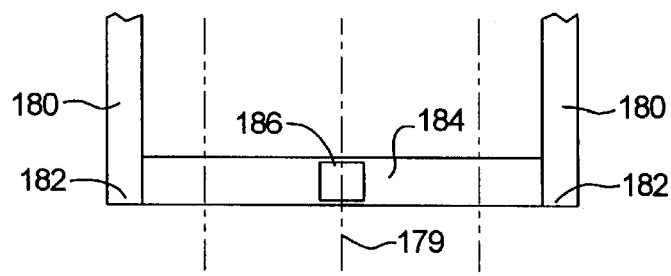
FIG. 15 is a somewhat schematic top plan view of one outer end of the support frame.

Finally, an eighth embodiment is shown in FIGS. 13, 14 and 15. Let us assume that a spacecraft has landed on another planet, asteroid, or some other location where there is some gravitational force, but with the gravitational force being less than on earth. For example, let us assume that this gravitational force is only half of the earth's gravitational force at the earth's surface. Yet it is desired to subject the astronaut to a force equal to the full force of the earth's gravity.

To accomplish this, there is provided an apparatus illustrated at 170 which comprises a central post 172 which is aligned along a vertical center axis 174. There are, in this particular embodiment, two support platforms 22e, mounted to a support frame 176 which has oppositely extending frame portions 178 extending radially from the vertical center axis 174 along a radial axis 179 that extends radially outwardly from the axis 174.

Also, for purposes of explaining the orientation of each of the platforms 22e, each platform 22e has the aforementioned transverse axis 26e which was shown and described with regard to the first embodiment, and which is at approximately the center of the platform 22e and extending transversely across the width of the platform 22e. In addition, the platform 22e shall be considered as having a lengthwise axis 181 which extends along the center line of the platform 22e from the head end to the foot end.

As can be seen in FIG. 15, each frame section 178 comprises a pair of side beams 180 which are connected at their outer end portions 182 to a transversely extending support beam 184. At the center of each cross member 184 there is a support mechanism 186 for its related platform 22e. The inner ends of the beams 180 are mounted to a center collar 188 at the post 172.

Each support mechanism 186 comprises a U-shaped bracket 190 fixedly connected to the bottom side of its related platform 22e at a central location. This U-shaped bracket 190 is rotatably connected to an intermediate support member 192 for rotation about an incline axis 194 which is parallel to the transverse axis 26 of the platform 22e. The support member 192 is in turn rotatably connected about a tilt axis 196 (aligned at right angles to the incline axis 194 of the U-shaped member 190), to a lower support member 198 that is in turn fixedly connected to the cross bar 184. In FIG. 15, this platform support device 186 is only shown schematically.

As a further possible option, the lower support member 198 could in turn be mounted for rotation about a vertically aligned axis 199 which is parallel to the vertical center axis 174 of the post 172. Thus, it can be seen that each platform 22e is (with the further addition of the rotation about the vertically aligned axis 199) mounted to what could be termed a "universal mount" where there are three axes of rotation (the incline axis 194, the tilt axis 196, and the vertical axis 199) so that it would be possible to orient the platform 22e in any position (unless obstructed by supporting structure). It should also be noted that the particular structure that is shown herein to create such a universal mount is only one of a number of such possible structures. For example, this could be accomplished simply by a ball and socket mount where the mounting member has a spherical surface, and the supported member has a spherically shaped socket to receive the mounting member. Then there would be suitable positioning mechanism, such as rotating accuators, (e.g. all small motors, electric or hydraulic) located to the axes, or positioning members such as hydraulic accuators connected from a base location to the platform 22e itself.

Further, it to be understood that the particular configuration of the mounting frame 178 and the center post 172 are given herein by way of example to show one method of mounting the platforms at spaced locations from a center of rotation, and that there are optimal designs. Again, since this is well within the skill of competent mechanical and/or civil engineers, various alternative configurations will not be listed in detail in this text.

It is to be understood that the position of each of the platforms 22e could be controlled by a suitable positioning mechanism which could be manually operated, or otherwise operated by a power driven postioning device. For example, there could be a small eletric or hydraulic motor interconnected between the two mounting members 190 and 192, and a similar or electric or hydraulic motor operatively connected between the mounting members 192 and 198.

Figure 17:
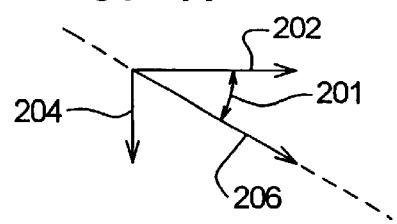

To describe the operation of the present invention, reference is first made to FIG. 13. It can be seen that the person 200 located on the right hand platform 22e (as seen in FIG. 13) has his or her feet positioned at a more radially outward location. It can also be seen that the right platform 22e is aligned at an angle of approximately thirty degrees (shown at 201 in FIG. 17) to the horizontal axis (referencing the horizontal axis to be at right angles to the gravitational force at that location). Let us also assume that it is desired that this person 198 should feel a simulated gravitational force equal to that on the earth. The frame 176 is rotated at a rotational velocity sufficient to create a centrifugal force (indicated at 202 in FIG. 17) so that when this is added to the gravitational force (indicated at 204 in FIG. 17), there is a resultant simulated force of gravity (indicated at 206 in FIG. 17) that is twice the force of gravity 204. It can be seen that this simulated gravitational force is directed parallel to the length of the person so that the person 198 would feel that he or she is in a standing position.

Figure 16:
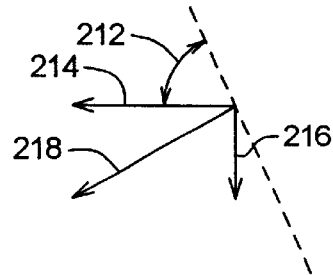
FIGS. 16 and 17 are diagrams illustrating the manner in which the gravitational and centrifugal force components react in the left and right platform members of FIG. 13.

At the left hand side of FIG. 13 the person 208 is located so that his or her feet 210 are at a more radially inward position, and the platform 22e is at an angle of sixty degrees (shown at 212 in FIG. 16) relative to the force of gravity. Thus, the centrifugal force 214 creates with the gravitational force at 216 a resultant radially outward and downward simulated gravitational force 218 which is directed perpendicular to the plane of the platform 22e. Thus, the person at 208 is in a position where the simulated gravitational force would be such that the person would feel that he or she is lying on a horizontal platform.

Also, it should be noted that the support device 186 is arranged so that the platform 22e can be tilted laterally about the tilt axis 196 which is parallel to the lengthwise axis 181 of the platform. This is illustrated in FIG. 14, where the platform 22e has been tilted from its position shown in broken lines to the slanted position (shown in full lines). This is accomplished by rotating the support member 192 relative to the support member 198. This tilting, as shown in FIG. 14, could be utilized in the time period where the platform 176 is either accelerating or decelerating, so that the inertial forces could be reacted in such a way so that combined with the gravitational force and the centrifugal force, the person would not feel the effect of such inertial forces.

To describe the operation of this seventh embodiment from start-up, first the power is delivered to the support frame 176 so that the power is increasing in a manner that the rate of acceleration is increasing. At this time, the platform 22e would be in the process of being tilted laterally (as shown in FIG. 14), and the tilt angle would increase until the rate of acceleration becomes constant. When the rate of acceleration is constant, the tilt angle will remain the same. Then, as the platform 22e is coming close to the maximum speed of rotation, the rate of acceleration would be decreased gradually, and during this time the platform 22e would be rotated back to a position with no tilt, as shown in FIG. 14 in the broken lines. At the same time that this is happening, the platform 22e would begin to be rotated about its transverse axis so that the angle of incline of the platform 22e would be increased at a rate which has a proportional relationship to the increase in rotational speed so that the resultant force of the centrifugal force component and the gravitational force component would be such that the angle of incline would be at least perpendicular to this resultant force or possibly moderately greater than necessary so that the person, in making the transition to the fully inclined position would still have a resultant force exerted on the person tending to move the person toward the foot end.

To relate this specifically to the left-hand platform in FIG. 13, let us assume that the person at 208 is laying horizontal with his head at a radially outward position. Just before the frame 176 is starting to rotate, it would possibly be desirable to operate the accuator that controls the tilt of the platform 22e so as to raise a person's head moderately so that the person 208 would have the sensation of being on a sloping platform with his feet resting on the end foot support 210. Then as the rotation started and the rate of acceleration is increasing, in addition to the lateral tilt of the platform 22e taking place, the angle of incline would also begin increasing. Again, to maintain the comfort of the person, the angle of incline of the platform 22e would be at least a slight amount greater than what would be called for to create the resultant force perpendicular to the platform 22e. Then as the rate of rotational speed was reaching the maximum so that the resultant would be creating the desired level of simulated gravity, the rate at which the angle of tilt of the platform 22e is changed would be reduced until the rotational speed of the platform reached a constant maximum speed.

From the above description, it is apparent that by coordinating the positioning of the plateform 22e about the two axis at 194 and 196, the simulated gravitation force that is exerted on the person could have both its magnitude and its direction changed either simultaneously or independently from one another, and this could be done in a manner that the person would always have the sensation that the simulated force of gravity was applied in a manner that the person would not feel the effects of motion. More specifically, if the acceleration of the rotational movement of the platform 178 were changed, then the person would feel the inertial effect of slowing down or speeding up. However, by being able to tilt the platform 22e (as indicated in FIG. 14), in either direction while also superimposing the rotational movement about the incline axis 194, the sensation of motion could be substantially totally eliminated.

It is obvious that various modifications could be made to the present invention without departing from the basic teachings thereof. For example, various structures and mechanisms which are shown herein, could be modified. More specifically, in the structure of the modules, there is shown one desired way of obtaining access into the module and also departing from the module. Various frame configurations have been shown. Different mechanisms for moving the platform to different orientations have been shown. A type of mounting has been shown in FIGS. 13 through 15 that provide what could be termed a universal joint. By applying reasonable mechanical skill, various mechanical substitutions could be made for all of these. For example, as mentioned previously, the swivel connection at 186 could be made in the form of a ball joint and operated by a piston and cylinders or other mechanisms. It is obvious that there are many types of mechanical devices and support devices which could change the orientation of the platforms. These are considered to be within the broader scope of the present invention.

Also, with regard to the various embodiments disclosed in FIGS. 6 through 12, it is evident that by consulting engineering treatises on structures of various sorts where loads are supported and other forces are reacted by various members or combinations of members acting in tension, compression, or in bending moments, there are a great variety of truss-like structures or combinations of structural components that could be used. This could depend in large part upon the particular environment in which the system of the present invention is operating. For example, if the system is being used in the weightless environment of outer space, where reactions must be reacted into the spaceship itself, or reacted by rockets, this would have different design criteria than if the system were used at a ground location, such as the moon or an asteroid or some other location where the gravity was less, such as shown in FIGS. 13 through 17.

Other modifications could be made without departing from the basic teachings of the present invention.

What is claimed is:

1. A system for generating a simulated gravitational environment for a person or persons, with a simulated gravitational force or forces, in a weightless or low gravity environment in a manner to enable a person to experience the benefit of the simulated gravitational environment while being able to be in different physical positions, such as a rest/sleep position and a more upright position, said system comprising:
    a) a base structure;
    b) at least one support structure to provide support for at least one person and which is mounted for rotational movement relative to said base structure about a main axis of rotation;
    c) at least one support platform having a support surface to support at least one person, said platform being mounted to said support structure at a platform location, and spaced from said main axis, so as to travel in a travel path around said main axis so that there is imposed on a person on the platform a centrifugal force component relative to the main axis of rotation, which centrifugal force component contributes at least in part to the simulated gravitation force or forces;
    d) said support platform having a main support surface arranged to support said person, said platform being moveable between a sleep/rest position where the support surface has an overall alignment orientation that is closer to perpendicular to said gravity simulated gravitational force, and a non-rest/sleep position where the support surface has an alignment orientation that is closer to being aligned to said gravity simulated force or forces, whereby a person can be located on said platform in the sleep/rest position and be in a resting and/or sleeping mode while experiencing a simulated gravity environment, and also be positioned in the non-rest/sleep position where the person can experience the simulated gravity environment while the person is more closely aligned to the gravity simulated force or forces.

2. The system as recited in claim 1, wherein said support platform has a foot end and a head end, a lengthwise axis extending from the foot end to the head end, and a transverse axis extending generally transversely to said lengthwise axis, said platform being arranged for rotational movement about a generally transverse axis of rotation parallel to said transverse axis to move between the sleep/rest position and the non-sleep/rest position.

3. The system as recited in claim 2, wherein the support platform is also arranged for angular movement along a secondary axis of rotation having a substantial alignment component parallel to the lengthwise axis, so that the platform can be moved to different angular positions laterally to compensate for acceleration and decelerating forces imposed on said platform on start-up and slow-down.

4. The system as recited in claim 1, wherein said platform said generally, transverse axis of rotation is between the foot end and the head end of the platform.

5. The system as recited in claim 4, wherein said platform has at least one configuration where the support surface is generally planar so as to present a generally level support surface in the sleep/rest position, and in the non-sleep/rest position provides a support surface that simulates more closely a standing position or a slanted standing position.

6. The system as recited in claim 1, wherein said system is adapted to be operated in a substantial weightless environment, and said support platform is arranged relative to said main axis of rotation so that the sleep/rest position and the non-sleep/rest position are oriented relative to the centrifugal force component as substantially being the same as the simulated gravitational force.

7. The system as recited in claim 1, wherein said system is designed for operation in a low gravity environment, where the system is subjected to a force of gravity less than the force of gravity on earth, said support platform being mounted to said support structure in a manner that with the support platform being moved around said main axis at a rotational speed to create a centrifugal force of a given value, so that the centrifugal force and the force of gravity provide a resultant force, said support platform being arranged so that in the sleep/rest position, overall alignment of the platform is closer to perpendicular to the resultant-force, and the non-sleep/rest position is more closely aligned to the resultant force.

8. The system as recited in claim 1, wherein there is at or proximate to said main axis of rotation an access structure having an access passageway through which a person can move, and at least one access opening providing access to said support platform.

9. A method for generating a simulated gravitational environment for a person or persons, with a simulated gravitational force or forces, in a weightless or low gravity environment in a manner to enable a person to experience the benefit of the simulated gravitational environment while being able to be in different physical positions, such as a rest/sleep position and a more upright position, said method comprising:
    a) providing a base structure;
    b) mounting at least one support structure to the base structure for rotational movement relative to said base structure about a main axis of rotation;
    c) mounting at least one support platform having a support surface to support at least one person, to said support structure at a platform location, so as to be spaced from said main axis;
    d) positioning a person on said support platform;
    e) rotating said support structure to cause said platform to travel in a travel path around said main axis so that there is imposed on a person on the platform a centrifugal force component relative to the main axis of rotation, which centrifugal force component contributes at least in part to the simulated gravitation force or forces;

f) moving said platform between two positions, namely a sleep/rest position where the support surface has an overall alignment orientation that is closer to perpendicular to said gravity simulated gravitational force, and a non-rest/sleep position where the support surface has an alignment orientation that is closer to being aligned to said gravity simulated force or forces, whereby a person can be located on said platform in the sleep/rest position and be in a resting and/or sleeping mode while experiencing a simulated gravity environment, and also be positioned in the non-rest/sleep position where the person can experience the simulated gravity environment while the person is more closely aligned to the gravity simulated force or forces.

10. The method as recited in claim 9, wherein said support platform has a foot end and a head end, a lengthwise axis extending from the foot end to the head end, and a transverse axis extending generally transversely to said lengthwise axis, said method further comprising rotating said platform about a generally transverse axis of rotation parallel to said transverse axis to move between the sleep/rest position and the non-sleep/rest position.

11. The method as recited in claim 10, wherein the support platform is also arranged for angular movement along a secondary axis of rotation having a substantial alignment component parallel to the lengthwise axis, said method further comprising rotating said platform to different angular positions about said secondary axis laterally to compensate for acceleration and decelerating forces imposed on said platform on start-up and slow-down.

12. The method as recited in claim 9, wherein said platform has at least one configuration where the support surface is generally planar so as to present a generally level support surface in the sleep/rest position, and in the non-sleep/rest position provides a support surface that simulates more closely a standing position or a slanted standing position.

13. The method as recited in claim 9, wherein said platform has a generally transverse axis of rotation which is between a foot end and a head end of the platform.

14. The method as recited in claim 9, wherein there is at or proximate to said main axis of rotation and generally aligned therewith an access structure having an access passageway through which a person can move, and at least one access opening providing access to said support platform.

15. The method as recited in claim 9, wherein said support structure comprises two axially spaced frame members on opposite sides of said support platform, and said support platform is mounted to said frame members about an axis of rotation extending between said frame members, whereby said support platform is able to be rotated to different angular orientations within the two frame members.

16. The method as recited in claim 15, wherein said frame members comprise truss-like structures mounted to a central support portion which rotates about said main axis of rotation.

17. The method as recited in claim 9, wherein said support structure has two mounting locations, by which said platform is supported from said support structure, said support structure having a radially outward support structure portion and a central support structure portion, and further comprising a plurality of tension members connecting to said outward support structure portion and to said central support structure portion to place tension forces at said mounting location of the support structure by which said platform is supported.

18. A system for generating a simulated gravitational environment for a person or persons, with a simulated gravitational force or forces, in a weightless or low gravity environment in a manner to enable a person to experience the benefit of the simulated gravitational environment while being able to be in different physical positions, such as a rest/sleep position and a more upright position, said system comprising:

a) a base structure arranged to be positioned in a weightless or low gravity environment;

b) a support structure to provide support for at least one person and which is mounted for rotational movement relative to said base structure about a main axis of rotation;

c) a support platform having a support surface to support at least one person, said platform being mounted to said support structure at a platform location, and spaced from said main axis, so as to travel in a travel path around said main axis so that there is imposed on a person on the platform a centrifugal force component relative to the main axis of rotation, which centrifugal force component contributes at least in part to the simulated gravitation force or forces;

d) said support platform having a main support surface arranged to support said person, said platform being moveable between a sleep/rest position where the support surface has an overall alignment orientation that is closer to perpendicular to said gravity simulated gravitational force, and a non-rest/sleep position where the support surface has an alignment orientation that is closer to being aligned to said gravity simulated force or forces, e) said support platform comprising at least two support sections which can be moved angularly with respect to one another so that one portion of a person's body can be supported by one platform section and a second portion of a person's body can be supported on the other platform section so that the two body portions can be angled with one another in a position other than straight line alignment;

whereby a person can be located on said platform in the sleep/rest position and be in a resting or sleeping mode while experiencing a simulated gravity environment, and also be positioned in the non-rest/sleep position where the person can experience the simulated gravity environment while the person is more closely aligned to the gravity simulated force or forces.

19. The system as recited in claim 18, wherein there is a third support section which can be moved angularly to at least one other of the support sections, whereby three different portions of the person's body can be supported at different angular locations.

20. The system as recited in claim 19, wherein said support sections are able to be positioned relative to one another so as to place a person in a seated or seated/reclining position.

21. A system for generating a simulated gravitational environment for a person or persons, with a simulated gravitational force or forces, in a weightless or low gravity environment in a manner to enable a person to experience the benefit of the simulated gravitational environment while being able to be in different physical positions, such as a rest/sleep position and a more upright position, said system comprising, a) a base structure arranged to be positioned in a weightless or low gravity environment;

b) a support structure to provide support for at least one person and which is mounted for rotational movement relative to said base structure about a main axis of rotation;
c) a support platform having a support surface to support at least one person, said platform being mounted to said support structure at a platform location, and spaced from said main axis, so as to travel in a travel path around said main axis so that there is imposed on a person on the platform a centrifugal force component relative to the main axis of rotation, which centrifugal force component contributes at least in part to the simulated gravitation force or forces;
d) said support platform having a main support surface arranged to support said person, said platform being moveable between a sleep/rest position where the support surface has an overall alignment orientation that is closer to perpendicular to said gravity simulated gravitational force, and a non-rest/sleep position where the support surface has an alignment orientation that is closer to being aligned to said gravity simulated force or forces,
e) said support structure comprising two axially spaced frame members on opposite sides of said support plateform, and said support platform is mounted to said frame members about an axis of rotation extending between said frame members, whereby said support platform-is able to be rotated to different angular orientations within the two frame members;
whereby a person can be located on said platform in the sleep/rest position and be in a resting or sleeping mode while experiencing a simulated gravity environment, and also be positioned in the non-rest/sleep position where the person can experience the simulated gravity environment while the person is more closely aligned to the gravity simulated force or forces.

22. The system as recited in claim 21, wherein said frame members comprise truss-like structures mounted to a central support portion which rotates about said main axis of rotation.

23. A system for generating a simulated gravitational environment for a person or persons, with a simulated gravitational force or forces, in a weightless or low gravity environment in a manner to enable a person to experience the benefit of the simulated gravitational environment while being able to be in different physical positions, such as a rest/sleep position and a more upright position, said system comprising:
a) a base structure arranged to be positioned in a weightless or low gravity environment;
b) a support structure to provide support for at least one person and which is mounted for rotational movement relative to said base structure about a main axis of rotation;
c) a support platform having a support surface to support at least one person, said platform being mounted to said support structure at a platform location, and spaced from said main axis, so as to travel in a travel path around said main axis so that there is imposed on a person on the platform a centrifugal force component relative to the main axis of rotation, which centrifugal force component contributes at least in part to the simulated gravitation force or forces;
d) said support platform having a main support surface arranged to support said person, said platform being moveable between a sleep/rest position where the support surface has an overall alignment orientation that is closer to perpendicular to said gravity simulated gravitational force, and a non-rest/sleep position where the support surface has an alignment orientation that is closer to being aligned to said gravity simulated force or forces,
e) said support platform having two mounting locations, by which said platform is supported from said support structure, said support structure having a radially outward support structure portion and a central support structure portion, and further comprising a plurality of tension members connecting to said outward support structure portion and to said central support structure portion to place tension forces at said mountin location of the support structure by which said platform is supported;
whereby a person can be located on said platform in the sleep/rest position and be in a resting or sleeping mode while experiencing a simulated gravity environment, and also be positioned in the non-rest/sleep position where the person can experience the simulated gravity environment while the person is more closely aligned to the gravity simulated force or forces.

24. A method for generating a simulated gravitational environment for a person or persons, with a simulated gravitational force or forces, in a weightless or low gravity environment in a manner to enable a person to experience the benefit of the simulated gravitational environment while being able to be in different physical positions, such as a rest/sleep position and a more upright position, said method comprising:
a) providing a base structure;
b) mounting a support structure to the base structure for rotational movement relative to said base structure about a main axis of rotation;
c) mounting a support platform having a support surface to support at least one person, to said support structure at a platform location, so as to be spaced from said main axis;
d) positioning a person on said support platform;
e) rotating said support structure to cause said platform to travel in a travel path around said main axis so that there is imposed on a person on the platform a centrifugal force component relative to the main axis of rotation, which centrifugal force component contributes at least in part to the simulated gravitation force or forces;
f) moving said platform between two positions, namely a sleep/rest position where the support surface has an overall alignment orientation that is closer to perpendicular to said gravity simulated gravitational force, and a non-rest/sleep position where the support surface has an alignment orientation that is closer to being aligned to said gravity simulated force or forces,
g) said support platform being characterized in that said support platform has at least two support sections, said method further comprising positioning said two support sections angularly with respect to one another so that one portion of a person's body can be supported by one platform section and a second portion of a person's body can be supported on the other platform section so that the two body portions can be angled with one another in a position other than straight line alignment;
whereby a person can be located on said platform in the sleep/rest position and be in a resting or sleeping mode while experiencing a simulated gravity environment, and also be positioned in the non-rest/sleep position where the person can experience the simulated gravity environment while the person is more closely aligned to the gravity simulated force or forces.

25. The method as recited in claim 23, wherein there is a third support section which can be moved angularly to at least one other of the support sections, said method further comprising positioning said platform sections in a sitting or reclining sitting position.

26. The method as recited in claim 24, wherein there is a third support section which can be moved angularly to at least one other of the support sections, whereby three different portions of the person's body can be supported at different angular locations.

27. A method for generating a simulated gravitational environment for a person or persons, with a simulated gravitational force or forces, in a weightless or low gravity environment in a manner to enable a person to experience the benefit of the simulated gravitational environment while being able to be in different physical positions, such as a rest/sleep position and a more upright position, said method comprising:

a) providing a base structure;
b) mounting a support structure to the base structure for rotational movement relative to said base structure about a main axis of rotation;
c) mounting a support platform having a support surface to support at least one person, to said support structure at a platform location, so as to be spaced from said main axis;
d) positioning a person on said support platform;
e) rotating said support structure to cause said platform to travel in a travel path around said main axis so that there is imposed on a person on the platform a centrifugal force component relative to the main axis of rotation, which centrifugal force component contributes at least in part to the simulated gravitation force or forces;
f) moving said platform between two positions, namely a sleep/rest position where the support surface has an overall alignment orientation that is closer to perpendicular to said gravity simulated gravitational force, and a non-rest/sleep position where the support surface has an alignment orientation that is closer to being aligned to said gravity simulated force or forces,
g) moving said platform in a substantial weightless environment, and, arranging said support platform relative to said main axis of rotation so that the sleep/rest position and the non-rest/sleep position are oriented relative to the centrifugal force component as substantially being the same as the simulated gravitational force;

whereby a person can be located on said platform in the sleep/rest position and be in a resting or sleeping mode while experiencing a simulated gravity environment, and also be positioned in the non-rest/sleep position where the person can experience the simulated gravity environment while the person is more closely aligned to the gravity simulated force or forces.

28. A method for generating a simulated gravitational environment for a person or persons, with a simulated gravitational force or forces, in a weightless or low gravity environment in a manner to enable a person to experience the benefit of the simulated gravitational environment while being able to be in different physical positions, such as a rest/sleep position and a more upright position, said method comprising:

a) providing a base structure;
b) mounting a support structure to the base structure for rotational movement relative to said base structure about a main axis of rotation;
c) mounting a support platform having a support surface to support at least one person, to said support structure at a platform location, so as to be spaced from said main axis;
d) positioning a person on said support platform;
e) rotating said support structure to cause said platform to travel in a travel path around said main axis so that there is imposed on a person on the platform a centrifugal force component relative to the main axis of rotation, which centrifugal force component contributes at least in part to the simulated gravitation force or forces;
f) moving said platform between two positions, namely a sleep/rest position where the support surface has an overall alignment orientation that is doser to perpendicular to said gravity simulated gravitational force, and a non-rest/sleep position where the support surface has an alignment orientation that is closer to being aligned to said gravity simulated force or forces,
g) moving said platform in a low gravity environment, where there is a force of gravity less than the force of gravity on earth, said method further comprising mounting said support platform to said support structure in a manner that with the support platform being moved around said main axis at a rotational speed to create a centrifugal force of a given value, the centrifugal force and the force of gravity provide a resultant force, and positioning of the platform so that in the sleep/rest position, overall alignment of the platform is closer to perpendicular to the resultant force, and the non-sleep/rest position is more closely aligned to the resultant force;

whereby a person can be located on said platform in the sleep/rest position and be in a resting or sleeping mode while experiencing a simulated gravity environment, and also be positioned in the non-rest/sleep position where the person can experience the simulated gravity environment while the person is more closely aligned to the gravity simulated force or forces.

* * * * *